(12) United States Patent
Nakamura et al.

(10) Patent No.: US 8,115,953 B2
(45) Date of Patent: Feb. 14, 2012

(54) IMAGE FORMING APPARATUS AND INFORMATION PROCESSING METHOD

(75) Inventors: Rie Nakamura, Kanagawa (JP); Miki Kouchi, Kanagawa (JP); Tetsuo Asakawa, Tokyo (JP); Akihiro Kakoi, Kanagawa (JP); Yoshinori Furuichi, Kanagawa (JP); Daisuke Noguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1204 days.

(21) Appl. No.: 11/846,122

(22) Filed: Aug. 28, 2007

(65) Prior Publication Data
US 2008/0049263 A1    Feb. 28, 2008

(30) Foreign Application Priority Data
Aug. 28, 2006 (JP) .................. 2006-230788

(51) Int. Cl.
G06F 3/12 (2006.01)
G06K 15/00 (2006.01)
G03F 3/08 (2006.01)
H04N 1/46 (2006.01)
(52) U.S. Cl. ............. 358/1.15; 358/1.16; 358/1.17; 358/524; 358/539
(58) Field of Classification Search .......... 358/1.9, 358/1.14–1.18, 524, 539
See application file for complete search history.

(56) References Cited

U.S. PATENT DOCUMENTS
5,889,596 A *  3/1999 Yaguchi et al. ............ 358/448
2006/0050974 A1*  3/2006 Tamura et al. ............ 382/232

FOREIGN PATENT DOCUMENTS

| JP | 05-068151 | 3/1993 |
|---|---|---|
| JP | 05-336321 | 12/1993 |
| JP | 06-233088 | 8/1994 |
| JP | 06-245042 | 9/1994 |
| JP | 08-116412 | 5/1996 |
| JP | 09-37018 | 2/1997 |
| JP | 09-163069 | 6/1997 |
| JP | 09-168081 | 6/1997 |
| JP | 09-284515 | 10/1997 |
| JP | 11-187191 | 7/1999 |
| JP | 11-225256 | 8/1999 |
| JP | 2003-087538 | 3/2003 |
| JP | 2003-234881 | 8/2003 |

OTHER PUBLICATIONS

Japanese Office Action mailed Oct. 12, 2010.

* cited by examiner

*Primary Examiner* — James A Thompson
(74) *Attorney, Agent, or Firm* — Harness, Dickey & Pierce, PLC

(57) ABSTRACT

An image forming apparatus is disclosed. The image forming apparatus comprises an input unit through which a condition for reading image data of a document is input, a reading unit to read the image data under the reading condition, a first storage unit to store the image data read by the reading unit, a second storage unit to store information indicative of a relationship between the reading condition and an estimated volume of the image data to be stored in the first storage unit, a data volume estimating unit that estimates a volume of the image data to be read based on the reading condition and the information stored in the second storage unit, and a determining unit to determine whether to read the image data based on the estimated data volume and a volume of the image data that have already been stored in the first storage unit.

21 Claims, 23 Drawing Sheets

FIG.6

| IMAGE QUALITY MODE | REQUIRED AVAILABLE CAPACITY (KByte) |
|---|---|
| HIGH QUALITY | 100 |
| HIGH SPEED | 30 |

FIG.16

| COMPRESSION METHOD | COLOR INFORMATION | IMAGE AREA | RESOLUTION | ESTIMATED DATA VOLUME ||
|---|---|---|---|---|---|
| | | | | AVERAGE VALUE | MAXIMUM VALUE |
| NON-COMPRESSION | MONOCHROME | A4 | 600dpi × 600dpi | X | X |
| COMPRESSION A | — | A4 | 600dpi × 600dpi | Y | 2Y |
| COMPRESSION A | — | A4 | 1200dpi × 1200dpi | 4.5Y | 10Y |
| COMPRESSION B | MONOCHROME | A4 | 600dpi × 600dpi | Z | 1.5Z |
| COMPRESSION B | FULL COLOR | A4 | 600dpi × 600dpi | 3Z | 5Z |

250e

IMAGE FORMING APPARATUS AND INFORMATION PROCESSING METHOD

BACKGROUND OF THE INVENTION

1. Field of the Invention

The present invention relates to an image forming apparatus.

2. Description of the Related Art

Image forming apparatuses, such as copy machines, need to have storage capacity for storing image data of plural pages of documents in order to provide functions of processing plural pages of a document (e.g. a sort function, a combine function, a double-sided printing function). However, image forming apparatuses that do not have a high-capacity storage unit including an HDD can store only image data of a limited number of pages of a document, and hence the storage space may become full during reading of the document.

Japanese Patent Laid-Open Publication No. 06-233088 (hereinafter referred to as "Patent Document 1") discloses a communication terminal device to solve such a problem. This communication terminal device compares a detected available memory size with first, second, and third thresholds. The communication terminal device removes image information from the memory if the available memory size drops to the first threshold, suspends storing images if the available memory size drops to the second threshold, restarts storing images if the available memory size exceeds the second threshold, and terminates storing images if the available memory size drops to the third threshold.

However, because the communication terminal device of Patent Document 1 determines whether it is possible to store image information based only on comparison of the available memory size with predetermined thresholds, even if read image information has a size smaller than the available memory and can be stored in the memory, the communication terminal device might terminate storing images.

SUMMARY OF THE INVENTION

In view of the foregoing, the present invention is directed to provide an image forming apparatus capable of improving efficiency of storing image data in a storage unit, an information processing method therefor, and a computer-readable medium storing a program for causing a computer to perform the information processing method.

According to an aspect of the present invention, there is provided an image forming apparatus that comprises an input unit through which a condition for reading image data of a document is input; a reading unit to read the image data under the reading condition input through the input unit; a first storage unit to store the image data read by the reading unit; a second storage unit to store information indicative of a relationship between the reading condition and an estimated volume of the image data to be stored in the first storage unit; a data volume estimating unit that estimates a volume of the image data to be read based on the reading condition and the information stored in the second storage unit; and a determining unit to determine whether to read the image data based on the estimated data volume and a volume of the image data that have already been stored in the first storage unit. The timing for reading the image data is controlled according to a determination result by the determining unit.

This image forming apparatus can improve efficiency of storing image data in the first storage unit.

According to other aspects of the present invention, there are provided an information processing method executable by the above-described image forming apparatus, and a computer-readable medium storing a program for causing a computer to perform the information processing method.

Embodiments of the present invention provide an image forming apparatus capable of improving efficiency of storing image data in a storage unit, an information processing method therefor, and a computer-readable medium storing a program for causing a computer to perform the information processing method.

BRIEF DESCRIPTION OF THE DRAWINGS

FIG. 6 is a table showing a relationship between the required available capacity and the image quality mode;

FIG. 16 illustrates an example of an estimated data volume table, wherein two estimated data volumes are registered for each set of plural conditions;

DETAILED DESCRIPTION OF THE PREFERRED EMBODIMENT

Figure 1:
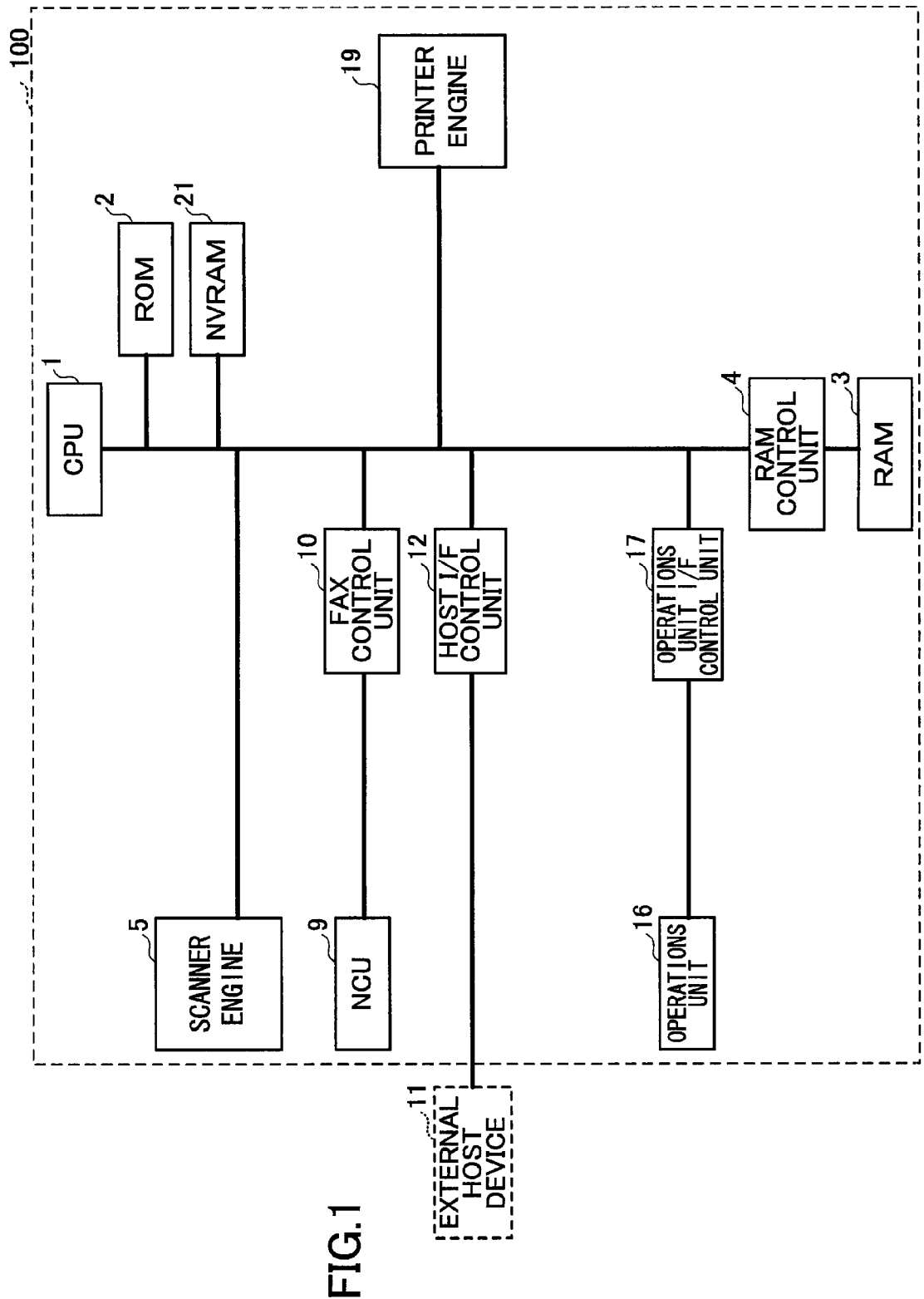
FIG. 1 is a block diagram showing a hardware configuration of an image forming apparatus according to an embodiment of the present invention.

The following describes preferred embodiments of the present invention with reference to the accompanying drawings. FIG. 1 shows a hardware configuration of an image forming apparatus 100 according to an embodiment of the present invention. With reference to FIG. 1, the image forming apparatus 100 is a multifunction machine having functions of printer, copier, fax machine, and the like integrated in a single casing. The image forming apparatus 100 comprises a CPU 1, a ROM 2, a RAM 3, a RAM control unit 4, a scanner engine 5, a network control unit (NCU) 9, a FAX control unit 10, a host I/F control unit 12, an operations unit 16, an operations unit I/F control unit 17, a printer engine 19, and a NVRAM 21.

The CPU 1 processes a program to issue instructions to or control each unit, thereby implementing functions of the image forming apparatus 100 of the present embodiment. The ROM 2 stores the program to be processed by the CPU 1, data used by the program, etc. The RAM 3 is controlled by the RAM control unit 4 and is used as a storage area for temporally storing data processed by the CPU 1, etc. The scanner engine 5 is an image input unit for a copier function and a scanner function, and is configured to read document images. The NCU 9 provides a connection to a public communication network, and sends a dial signal to call the destination. The FAX control unit 10 controls a FAX function. For instance, the FAX control unit 10 demodulates data received from the NCU 9 upon reception of a FAX transmission, and generates print data to be printed by the printer engine 19. Images received through FAX transmission may be input from not only the scanner engine 5 but also from an external host device 11.

The host I/F control unit 12 is an image input unit for a printer function, and is configured to receive print data from the external host device 11. Interfaces to be controlled by the host I/F control unit 12 are not limited to specific types of interfaces. Examples of the interface include local connections such as IEEE 1284 and USB, and wired or wireless network connections such as Ethernet (TM). The operations unit 16 includes an operations panel serving as a man-machine interface for users, comprising buttons for operating the image forming apparatus 100, status indicators (display units such as LED and LCD, speakers, and the like), etc. The operations unit I/F control unit 17 is configured to input information from and output information to the operations unit 16. The printer engine 19 is a print output unit. The image forming method is not limited to specific methods, and may be any of a laser method, an LED method, and an inkjet method. The NVRAM 21 is a non-volatile memory for storing information specific to the image forming apparatus 100 (e.g. a counter value indicative of the number of copies).

Figure 2:
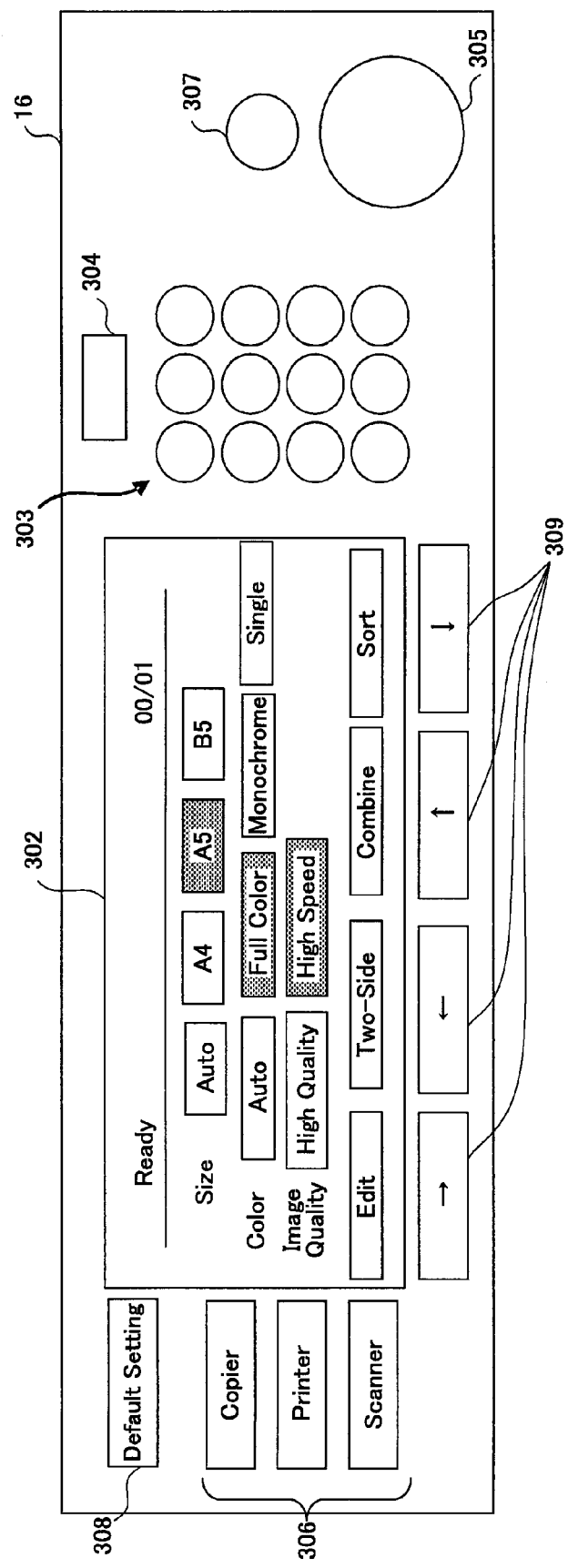
FIG. 2 is a diagram showing an example of an operations unit.

FIG. 2 is a diagram showing an example of an operations unit 16. With reference to FIG. 2, the operations unit 16 comprises a display unit 302, a numeric keypad 303, a reset key 304, a start key 305, application switching keys 306, a clear/stop key 307, and a default setting key 308.

The display unit 302 displays character strings, bitmaps, etc., and includes a touch panel used for setting reading conditions. The numeric keypad 303 is used for inputting the number of sets to be printed. The reset key 304 is used for resetting the copy mode. The start key 305 is used for starting a copy operation and a document reading operation. The application switching keys 306 are used for switching functions among a copier function, a printer function, a scanner function, etc. The clear/stop key 307 is used for interrupting a copy operation and resetting the number of sets to be printed. The default setting key 308 is used for setting the initial values of parameters for the copier function, the printer function, the scanner function, etc.

Figure 3:
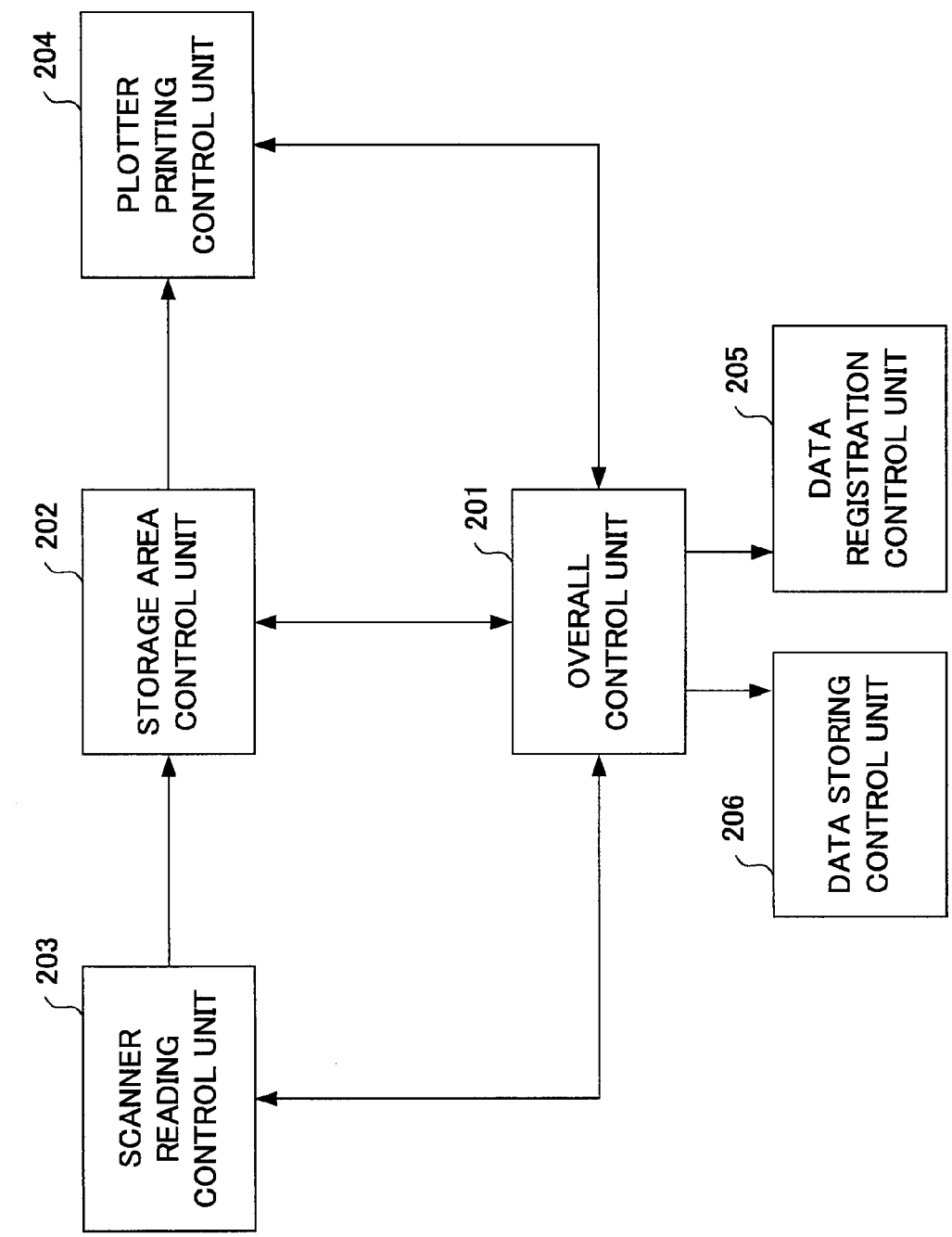
FIG. 3 is a functional block diagram of an image forming apparatus according to an embodiment of the present invention.

FIG. 3 is a functional block diagram of the image forming apparatus 100 according to an embodiment of the present invention. With reference to FIG. 3, the image forming apparatus 100 comprises an overall control unit 201, a storage area control unit 202, a scanner reading control unit 203, a plotter printing control unit 204, a data registration control unit 205, and a data storing control unit 206. These units are realized by loading the program stored in the ROM 2 into the RAM 3 and processing the program by the CPU 1.

The overall control unit 201 controls all the operations performed by the CPU 1. For example, the overall control unit 201 controls the operations unit 16, the host I/F control unit 12, the FAX control unit 10, etc. It is to be noted that control conditions are set through the operations unit 16.

The storage area control unit 202 manages a part of a storage area of the RAM 3 (hereinafter referred to as an "image storage area") for storing image data received from input units such as the scanner engine 5 and the host I/F control unit 12. The scanner reading control unit 203 controls the scanner engine 5. The plotter printing control unit 204 controls the printer engine 19. The data registration control unit 205 manages a parameter indicating the volume of image data in the image storage area required for achieving productivity of image formation by the image forming apparatus 100 based on its specification. The data storing control unit 206 estimates, upon reading of image data by the scanner engine 5, the volume of data to be stored into the image storage area. The data volume estimated by the data storing control unit 206 is hereinafter referred to as an "estimated data volume". The estimated data volume is determined based on a table (hereinafter referred to as an "estimated data volume table") showing reading conditions (such as resolution, paper size, and monochrome/color) and the estimated volume of data to be stored under each condition. The estimated data volume table is stored in the NVRAM 21 or the ROM 2.

Figure 4:
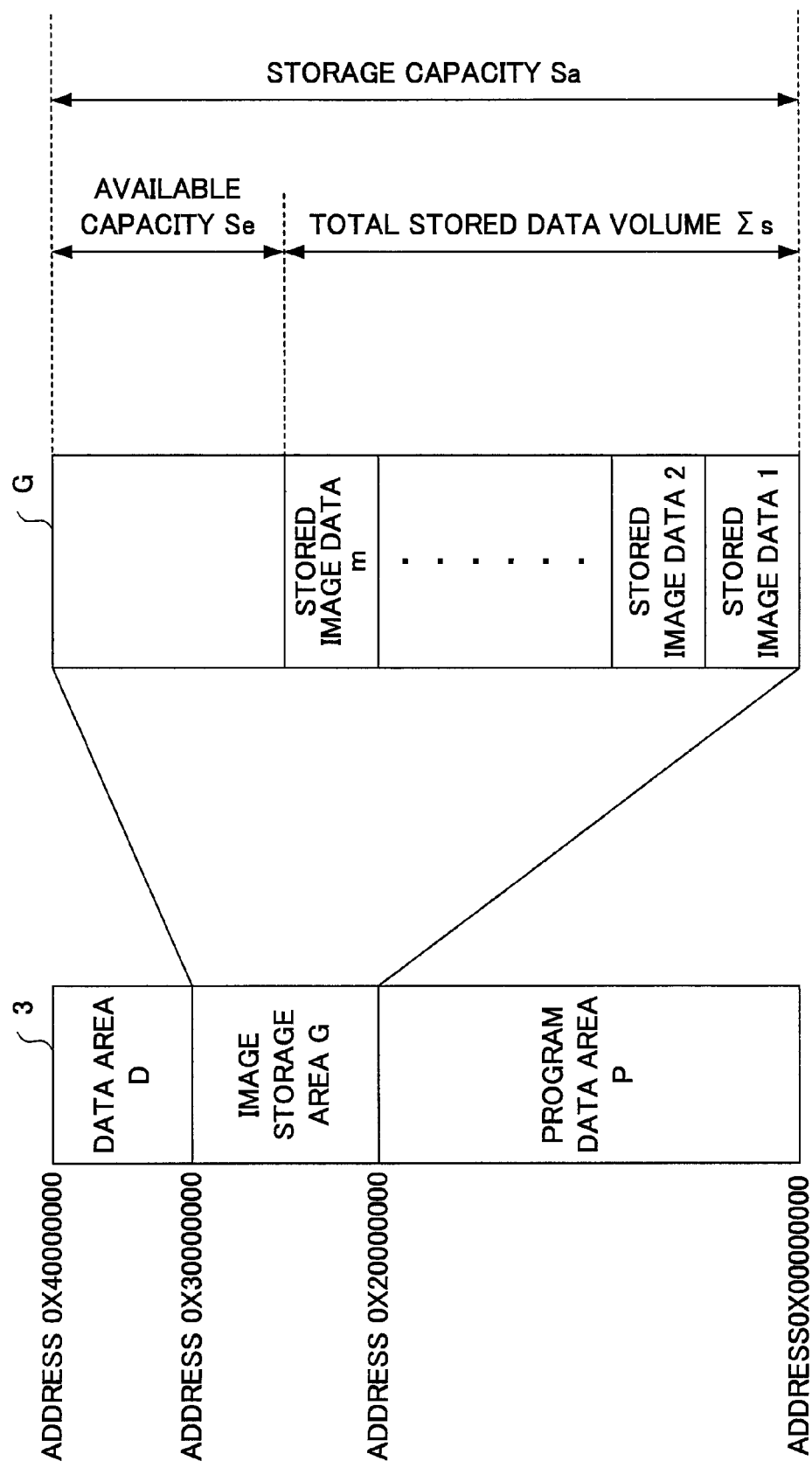
FIG. 4 is a diagram used to explain an image storage area.

The image storage area of the RAM 3 is described below in greater detail. FIG. 4 is a diagram used to explain the image storage area. As shown in FIG. 4, the storage area of the RAM 3 is divided into a program data area P, an image storage area G, and a data area D.

The program data area P stores various application programs. The data area D stores configuration settings of the image forming apparatus 100 and calculated values resulting from program execution. The image storage area G stores, as described above, image data received from input units such as the scanner engine 5 and the host I/F control unit 12. As shown in FIG. 4, the image storage area G is managed according to parameters including a storage capacity $Sa$, an available capacity $Se$, and a total stored data volume $\Sigma s$.

The storage capacity Sa represents the maximum capacity for storing image data. The total stored data volume Σs represents the total data volume of all the image data that have been input from the input unit and stored in the image storage area G. The storage area control unit 202 detects the available capacity Se of the image storage area G based on the storage capacity Sa and the total stored data volume Σs. More specifically, the storage area control unit 202 detects the available capacity Se of the image storage area G by deducting the total stored data volume Σs from the storage capacity Sa.

In FIG. 4, each of stored image data 1, stored image data 2, . . . , and stored image data m corresponds to image data read by one scanning operation (e.g. image data of one page). The reason why the image data of plural pages are stored together as shown in FIG. 4 is because image data of plural pages need to be buffered for, e.g., a sort function, a combine function, and a double-sided printing function to produce an output result.

The following describes processing performed by the image forming apparatus 100 of FIG. 3 for determining whether to start image data reading upon input of new image data from the input unit.

Figure 5:
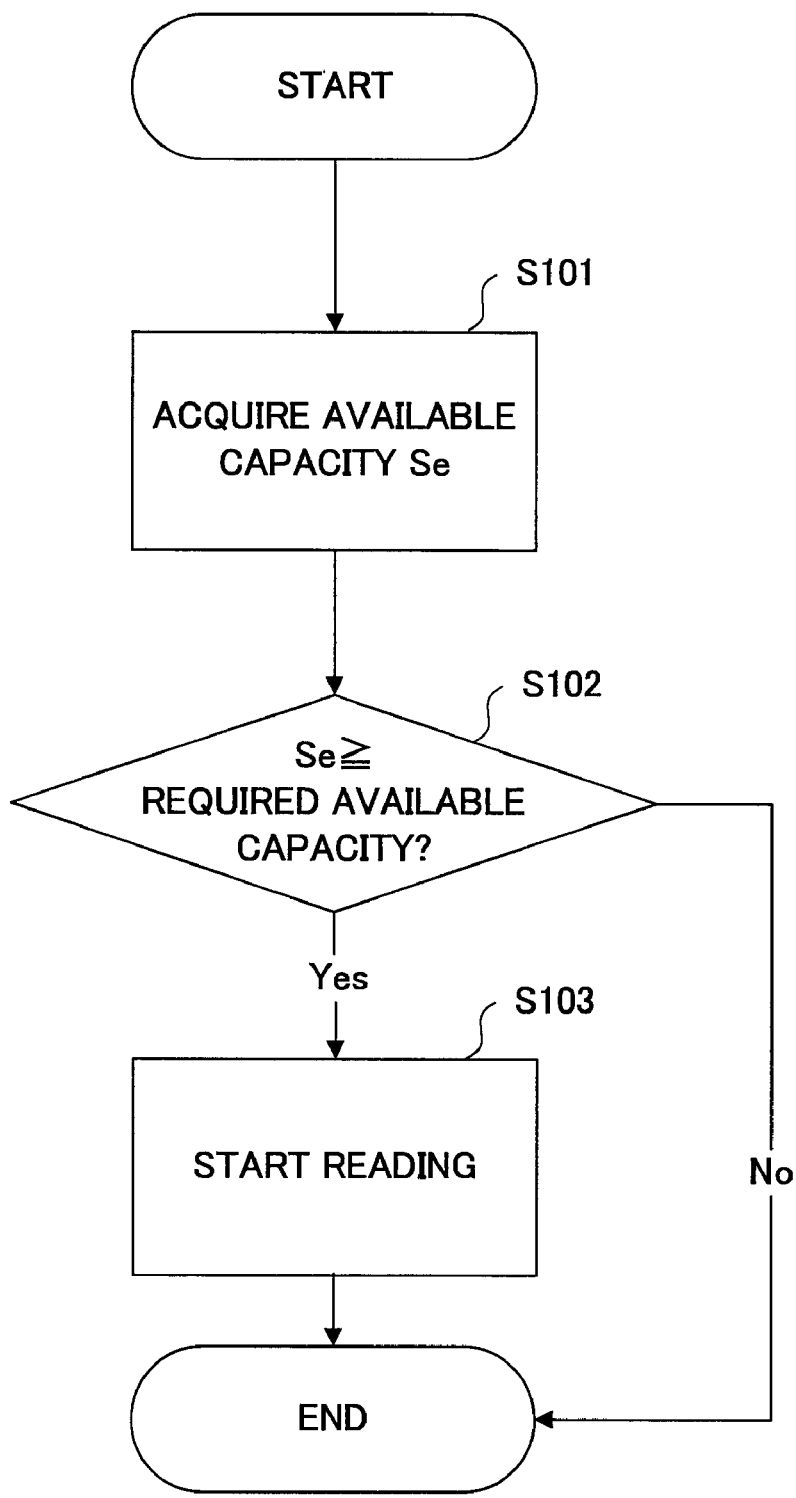
FIG. 5 is a flowchart showing a process for controlling the timing for starting image data reading according to a first embodiment of the present invention.

FIG. 5 is a flowchart showing a process for controlling the timing for starting image data reading according to a first embodiment. When a user places a document on the image forming apparatus 100, inputs a reading condition, and presses the start key to start reading the document, the processing shown in FIG. 5 is executed every time before printing each page of the document, for example.

First, the overall control unit 201 acquires an available capacity Se of the image storage area G from the storage area control unit 202 (S101). Then, the overall control unit 201 compares the available capacity Se with a required available capacity, which is determined based on the reading condition, so as to determine whether to start (execute) reading image data (S102). If the available capacity Se is equal to or greater than the required available capacity (Yes in S102), the overall control unit 201 instructs the scanner reading control unit 203 to start the reading (S103). Thus, the reading of the image data is started. If, otherwise, the available capacity Se is less than the required available capacity (No in S102), the overall control unit 201 does not start the reading of the image data.

The required available capacity is determined based on the reading condition. The reading condition is not limited to specific one, and may include any information about items of the reading condition. For example, the image quality mode may be used. FIG. 6 is a table 210 showing a relationship between the required available capacity and the image quality mode. Based on the table 210 of FIG. 6, when the high quality mode is selected, if the available capacity Se is equal to or greater than 100 KB, the reading starts. If otherwise the available capacity Se is less than the 100 KB, the reading does not start. The information shown in the table 210 is pre-registered in the ROM 2 or the NVRAM 21.

Figure 7:
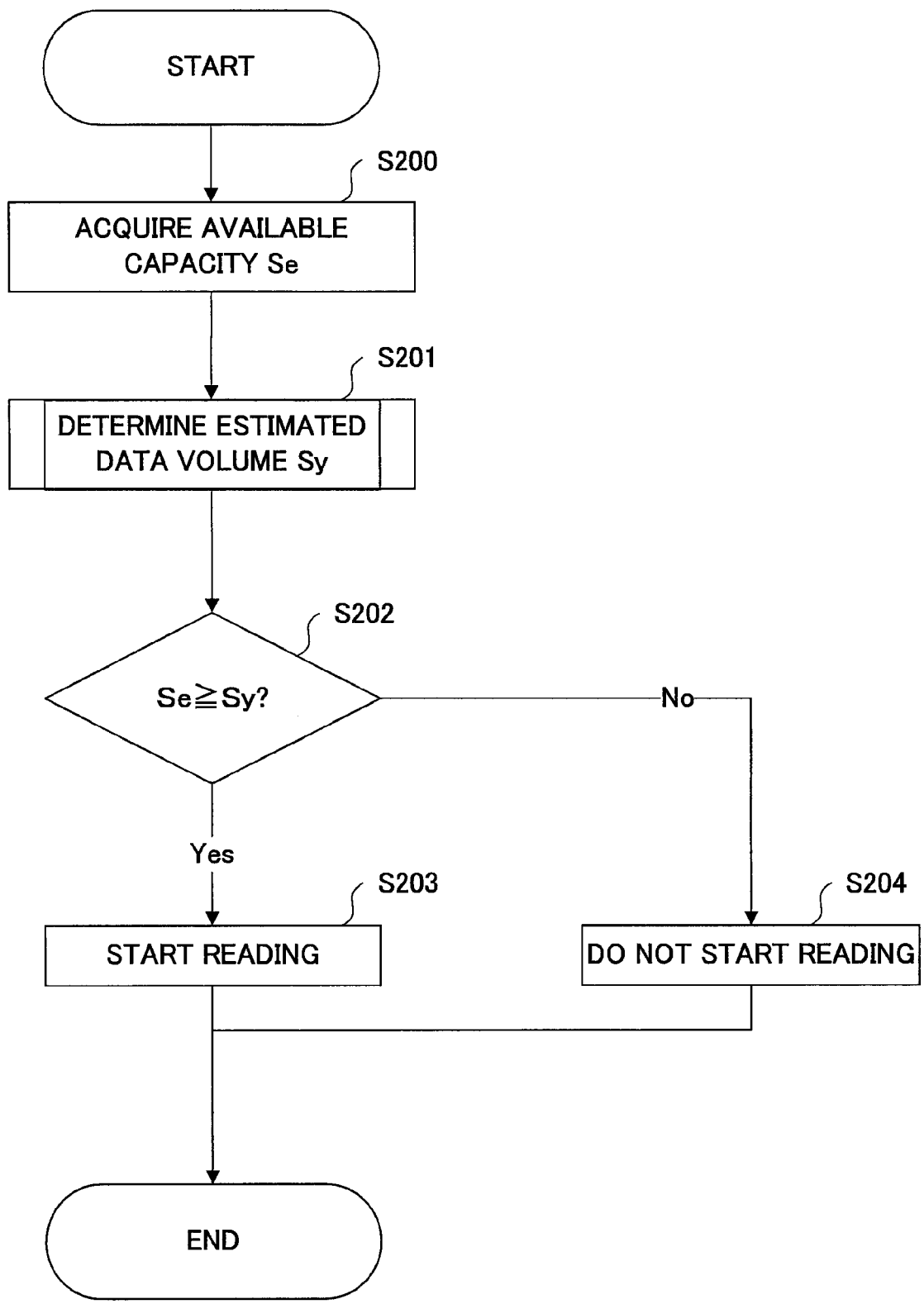
FIG. 7 is a flowchart showing a process for controlling the timing for starting image data reading according to a second embodiment of the present invention.

A second embodiment is described below with reference to FIG. 7. FIG. 7 is a flowchart showing a process for controlling the timing for starting image data reading according to the second embodiment.

First, the overall control unit 201 acquires an available capacity Se of the image storage area G from the storage area control unit 202 (S200). Then, the data storing control unit 206 determines an estimated data volume Sy of image data to be read (hereinafter referred to as a "to-be-read image") based on a reading condition (S201). This operation is described below in greater detail.

Then, the overall control unit 201 determines whether to start reading the to-be-read image based on the available capacity Se and the estimated data volume Sy (S202). If Se≧Sy, the overall control unit 201 starts the reading of the to-be-read image (S203). If Se<Sy, the overall control unit 201 determines that the to-be-read image cannot be stored and hence does not start image reading (S204).

Generally, once reading conditions (such as resolution, paper size, and monochrome/color) are specified, it is possible to calculate the data volume of the to-be-read image. In this embodiment, however, the estimated data volume Sy is used because the image data may be stored in a compressed format in order to minimize use of the memory space. The volume of the image data after compression varies depending on the content of the image data and the compression method, and cannot be determined based on the reading condition before compression. Of course, the volume of the image data after compression can be determined after compression. That is, determination whether the image data can be stored is made only after reading the image data. For this reason, the image forming apparatus 100 determines the estimated data volume Sy of the data volume of the to-be-read image, and determines whether the to-be-read image can be stored based on the estimated data volume Sy. In this way, the determination whether the image data can be stored is made before reading the image data.

As the estimated data volume Sy is still an estimation, and does not always accurately match the actual data volume. Therefore, if the estimated data volume Sy is less than the actual data volume, i.e., if the data volume is underestimated, memory overflow may occur. To avoid this problem, it is preferable to have at least two estimated data volumes. For example, one may be the average value of data volumes determined based on the content of a document, reading condition, and compression method; and the other may be the maximum data volume (maximum value) estimated based on the content of a document, reading condition, and compression method. The average value and the maximum value may be calculated based on data of experimental results or may be logically calculated. The average value is hereinafter referred to as an "estimated data volume Sy1", and the maximum value is hereinafter referred to as an "estimated data volume Sy2". In the case of using two estimated data volumes, the two estimated data volumes are registered in the estimated data volume table.

However, it is not efficient to always use two estimated data volumes Sy for determining whether the image data can be stored. Therefore, the image forming apparatus 100 of this embodiment switches which one of the two estimated data volumes is to be used at a predetermined threshold. This threshold is hereinafter referred to as an "estimated data volume switching stored data volume Sf" or simply as a "switching threshold Sf".

Figure 8:
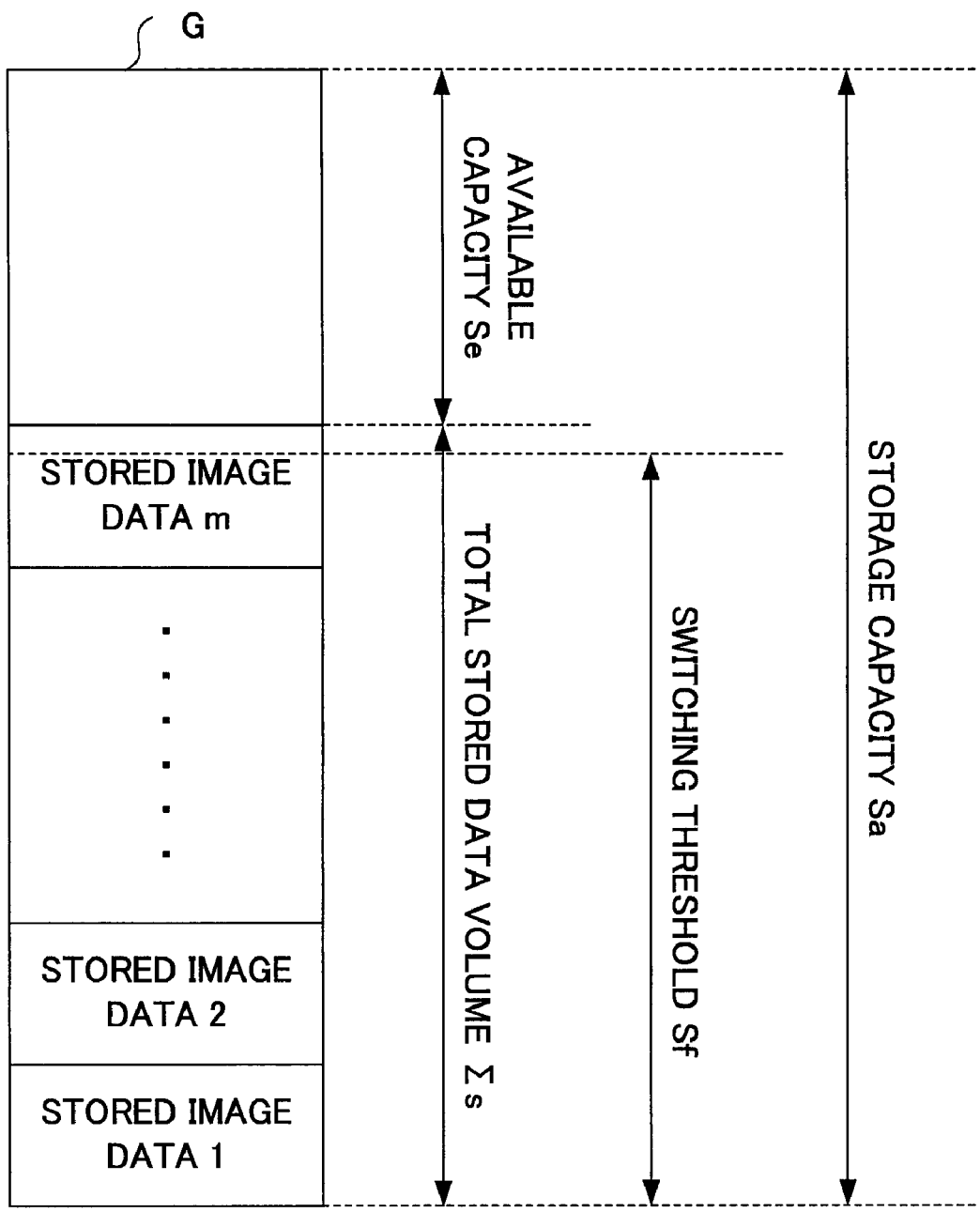
FIG. 8 is a diagram used to explain a switching threshold.

FIG. 8 is a diagram used to explain the switching threshold Sf. As shown in FIG. 8, the switching threshold Sf is a parameter defined as a measure in the image storage area G.

Figure 9:
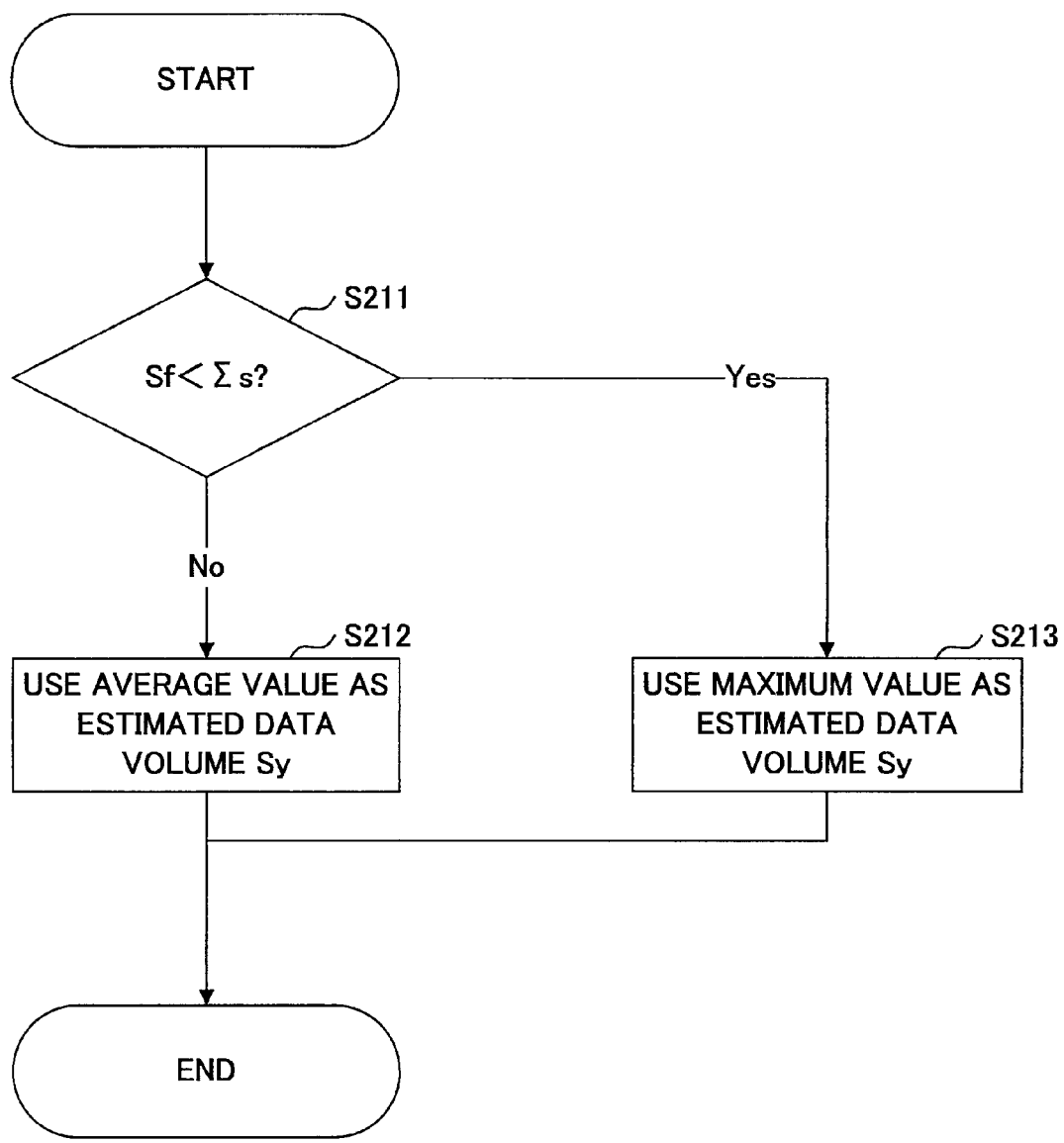
FIG. 9 is a flowchart showing a process for switching two estimated data volumes.

FIG. 9 is a flowchart showing a process for switching the two estimated data volumes.

The data storing control unit 206 compares the switching threshold Sf with the total stored data volume Σs acquired from the storage area control unit 202 (S211). The switching threshold Sf may be pre-registered in an area of the ROM 2 or the NVRAM 21 that can be referred to by the data storing control unit 206, or may be automatically calculated upon execution of a copy operation or the like as described below.

If the total stored data volume Σs is equal to or less than the switching threshold Sf (No in S211), the data storing control unit 206 uses the estimated data volume Sy1 (the average value) as the estimated data volume Sy (S212). If otherwise the total stored data volume Σs is greater than the switching threshold Sf (Yes in S211), the data storing control unit 206 uses the estimated data volume Sy2 (the maximum value) as the estimated data volume Sy (S213).

The switching threshold Sf may be determined based on, for example, the maximum data volume after compression based on the specification of the image forming apparatus 100. More specifically, the switching threshold Sf may be calculated by deducting the maximum data volume after compression from the storage capacity Sa. The maximum data volume after compression based on the specification of the image forming apparatus 100 as used herein represents the volume of image data of a document, of which paper size is the maximum size readable by the image forming apparatus 100, read at the maximum resolution and compressed with the lowest compression efficiency. In the case where the image forming apparatus 100 is capable of reading color images, the maximum data volume after compression is determined also based on the volume of image data read with colors.

Determining the switching threshold Sf as described above and switching the estimated data volumes Sy as shown in FIG. 9 make it possible to avoid the risk of memory overflow. Furthermore, when the total stored data volume Σs is below the switching threshold Sf, the estimated data volume Sy1 is used for determining whether image data can be stored, so that a greater volume of image data can be stored in the image storage area G compared to the case where the estimated data volume Sy2 is always used.

Figure 10:
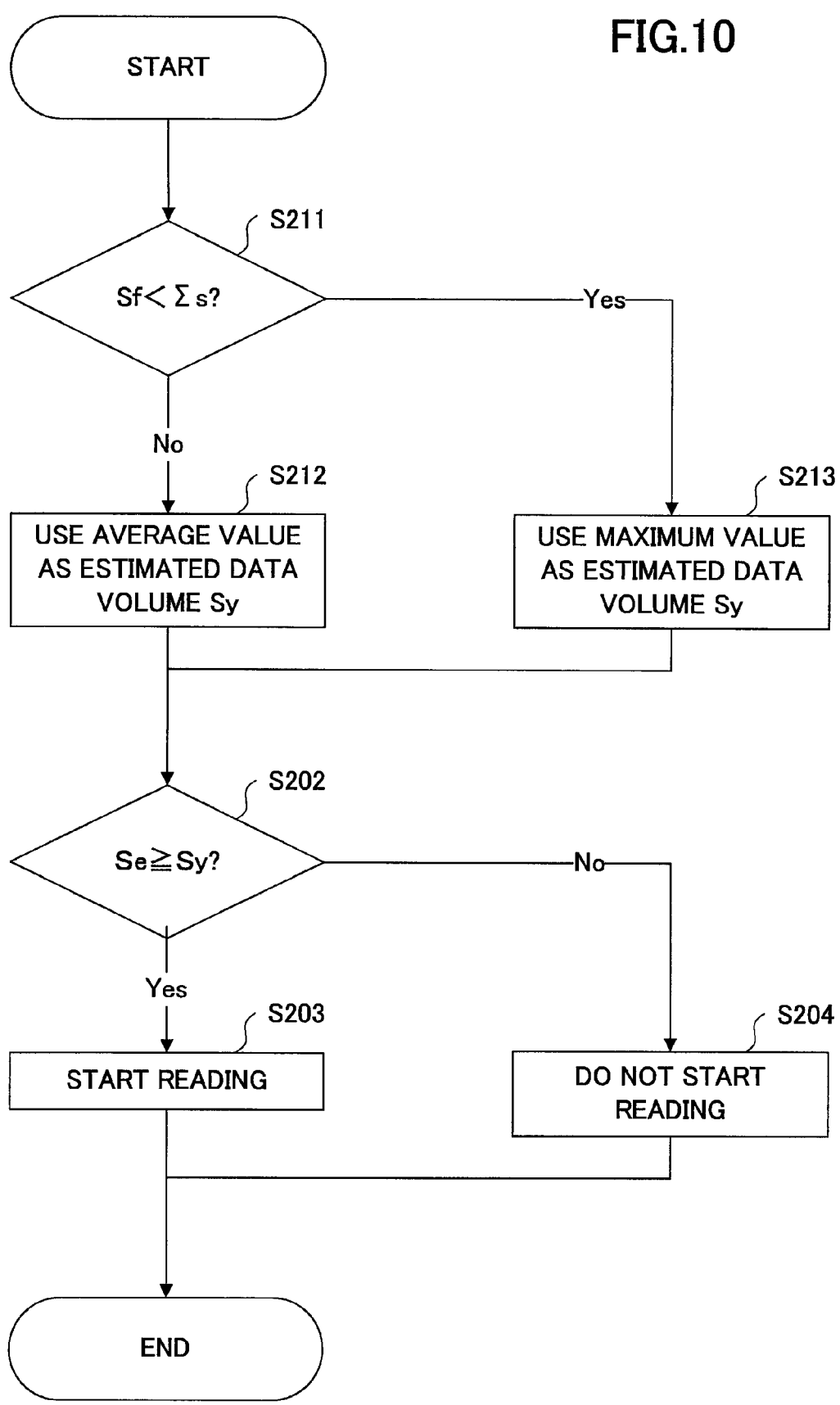
FIG. 10 is a flowchart showing a process for determining whether image data can be stored, in which processing for switching estimated data volumes is incorporated.

The processing shown in FIG. 9 may be performed at Step S201 of FIG. 7. If the processing of FIG. 9 is incorporated in the flowchart of FIG. 7, the flowchart may be modified as show in FIG. 10. FIG. 10 is a flowchart showing the processing for determining whether image data can be stored, in which the processing for switching the estimated data volumes is incorporated. In FIG. 10, steps the same as those in FIG. 7 and FIG. 9 are denoted by the same step numbers, and therefore a detailed description of the flowchart of FIG. 10 is not provided herein.

A method of calculating the estimated data volume Sy is described below. First, a method of determining the estimated data volume Sy based on resolution is described. In determining the estimated data volume Sy based on resolution, an estimated data volume table configured as shown in FIG. 11 is used, for example.

Figure 11:
FIG. 11 illustrates an example of an estimated data volume table, wherein the estimated data volume is based on resolution.

FIG. 11 illustrates an example of an estimated data volume table, wherein an estimated data volume is based on resolution. In an estimated data volume table 250a of FIG. 11, X (KB) is registered as an estimated data volume for a resolution of 300 dpi×300 dpi.

If a reading condition, which has been selected on the operations unit 16 and entered by pressing the start key 305, specifies a resolution of a 600 dpi×600 dpi, for example, the data volume of a to-be-read image is estimated to be twice of that of 300 dpi×300 dpi both in the main scanning direction and the sub scanning direction. Accordingly, the data storing control unit 206 determines that the estimated data volume Sy is 4X based on the estimated data volume table 250a. If a reading condition specifies a resolution of 300 dpi×300 dpi, the data storing control unit 206 determines that the estimated data volume Sy is X. That is, if the estimated data volume table 250a does not include a record for the specified resolution, the data storing control unit 206 determines the estimated data volume Sy based on the registered information. In the case where the ROM 2 or the NVRAM 21 has sufficient space, estimated data volumes may be registered one for each of the resolutions available in the image forming apparatus 100.

This method of estimation based on resolution is effective and can provide an accurate estimation in the case where the image forming apparatus 100 is a monochrome type and supports a small range of reading image areas (image sizes). Although only one estimated data volume is registered in the estimated data volume table 250a of FIG. 11, two estimated data volumes, i.e., one of the average value and the other of the maximum value, may be registered so as to enable the processing of switching the estimated data volumes Sy as previously described with reference to FIG. 9.

Next, a method of determining the estimated data volume Sy based on color information is described. In determining the estimated data volume Sy based on color information, an estimated data volume table configured as shown in FIG. 12 is used, for example.

Figure 12:
FIG. 12 illustrates an example of an estimated data volume table, wherein the estimated data volume is based on color information.

FIG. 12 illustrates an example of an estimated data volume table, wherein an estimated data volume is based on color information. In an estimated data volume table 250b of FIG. 12, X (KB) is registered as an estimated data volume for color information indicative of monochrome.

If a reading condition, which has been selected on the operations unit 16 and entered by pressing the start key 305, specifies color information indicative of full color, for example, because data for four colors C (cyan), M (magenta), Y (yellow), and K (black) are required, the data volume of a to-be-read image is estimated to be four times that of monochrome. Accordingly, the data storing control unit 206 determines that the estimated data volume Sy is 4X based on the estimated data volume table 250b. If a reading condition specifies color information indicative of monochrome, the data storing control unit 206 determines that the estimated data volume Sy is X. That is, if the estimated data volume table 250b does not include a record for the specified color information, the data storing control unit 206 determines the estimated data volume Sy based on the registered information. In the case where the ROM 2 or the NVRAM 21 has sufficient space, estimated data volumes may be registered one for each piece of color information available in the image forming apparatus 100.

This method of estimation based on color information is effective and can provide an accurate estimation in the case where the image forming apparatus 100 is a color type and supports a small range of reading image areas (image sizes). Although only one estimated data volume is registered in the estimated data volume table 250b of FIG. 12, two estimated data volumes, i.e., one of the average value and the other of the maximum value, may be registered so as to enable the processing of switching the estimated data volumes Sy as previously described with reference to FIG. 9.

Next, a method of determining the estimated data volume Sy based on image area to be stored in a storage unit is described. In determining the estimated data volume Sy based on image area, an estimated data volume table configured as shown in FIG. 13 is used, for example.

Figure 13:
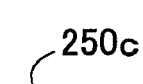
FIG. 13 illustrates an example of an estimated data volume table, wherein the estimated data volume is based on image area.

FIG. 13 illustrates an example of an estimated data volume table, wherein an estimated data volume is based on image area. In an estimated data volume table 250c of FIG. 13, X (KB) is registered as an estimated data volume for the image area of A4.

If a reading condition, which has been selected on the operations unit 16 and entered by pressing the start key 305, specifies a reading image area of A5, the data storing control unit 206 determines that the estimated data volume Sy is ½X based on the estimated data volume table 250c. This is because the area of A5 is a half of A4. If a reading condition specifies a reading image area of A4, the data storing control unit 206 determines that the estimated data volume Sy is X.

That is, if the estimated data volume table 250c does not include a record for the specified reading image area, the data storing control unit 206 determines the estimated data volume Sy based on the registered information. In the case where the ROM 2 or the NVRAM 21 has sufficient space, estimated data volumes may be registered one for each of the reading image areas available in the image forming apparatus 100.

This method of estimation based on the image area is effective for the image forming apparatus 100 that supports a wide range of image sizes including, e.g., A3 size. Although only one estimated data volume is registered in the estimated data volume table 250c of FIG. 13, two estimated data volumes, i.e., one of the average value and the other of the maximum value, may be registered so as to enable the processing of switching the estimated data volumes Sy as previously described with reference to FIG. 9.

Next, a method of determining the estimated data volume Sy based on a compression method is described. In determining the estimated data volume Sy based on compression method, an estimated data volume table configured as shown in FIG. 14 is used, for example.

Figure 14:
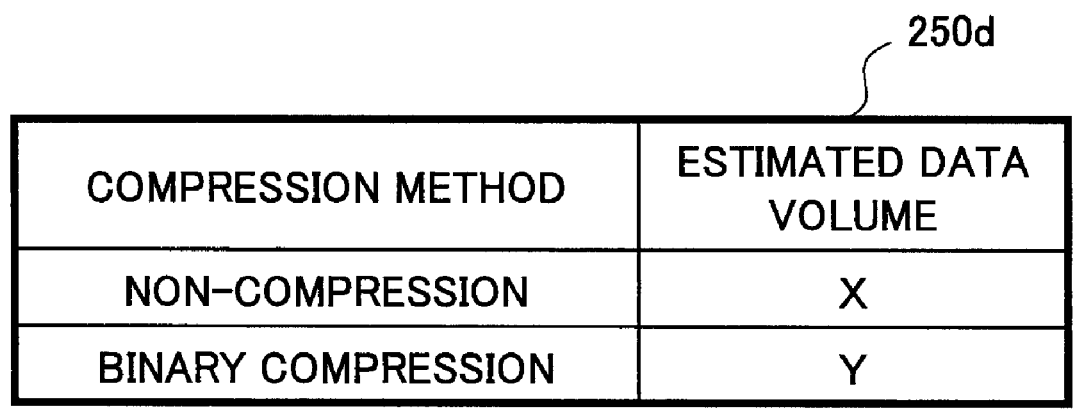
FIG. 14 illustrates an example of an estimated data volume table, wherein the estimated data volume is based on compression method.

FIG. 14 illustrates an example of the estimated data volume table, wherein an estimated data volume is based on compression method. In an estimated data volume table 250d of FIG. 14, X (KB) is registered as an estimated data volume in the case of not using a compression method, and Y (KB) is registered as an estimated data volume in the case of using a known binary compression method. Herein, "Y" indicates the data volume after compression.

Figure 15:
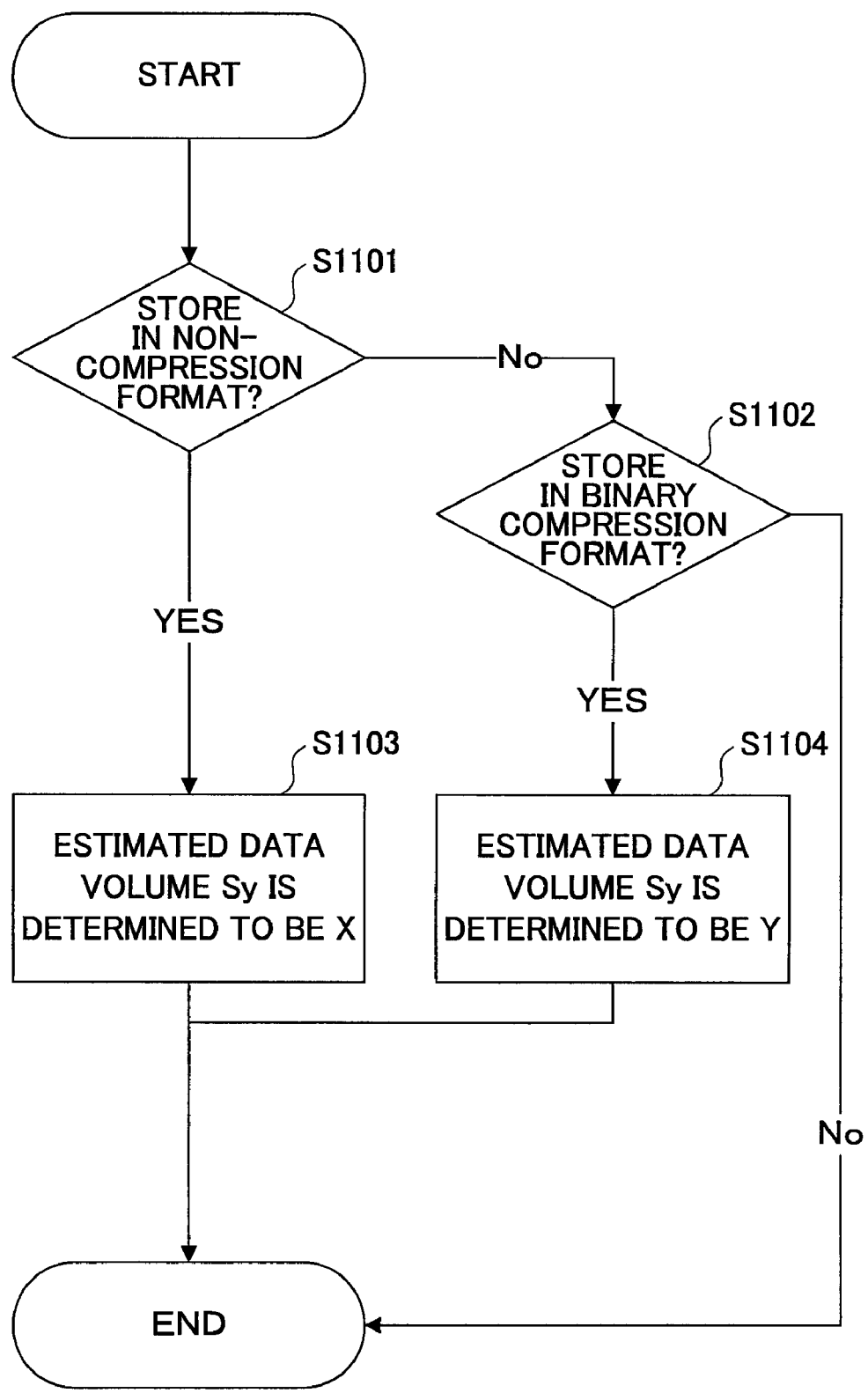
FIG. 15 is a flowchart showing a process for determining the estimated data volume based on compression method.

FIG. 15 is a flowchart showing a process for determining the estimated data volume based on a compression method. The processing shown in the flowchart of FIG. 15 uses the estimated data volume table 250d of FIG. 14.

If a reading condition, which has been selected on the operations unit 16 and entered by pressing the start key 305, specifies to store image data in an non-compressed format (Yes in S1101), the data storing control unit 206 determines that the estimated data volume Sy is X based on the estimated data volume table 250d (S1103).

If otherwise a reading condition specifies to store image data in a binary compressed format (Yes in S1102), the data storing control unit 206 determines that the estimated data volume Sy is Y based on the estimated data volume table 250d (S1104).

This method of estimation based on compression method is effective in the case where various compression methods, such as non-compression, binary compression, and JPEG compression, are available and the data volume after compression widely varies depending on the compression method. For instance, this method is effective for an image forming apparatus 100 having an electronic sort function or the like and configured to store image data in a compressed format when a large volume of data are required for electronic sorting, and otherwise store image data in a non-compressed format. Although only one estimated data volume is registered for each compression and non-compression in the estimated data volume table 250d of FIG. 14, two estimated data volume, i.e., one of the average value and the other of the maximum value, may be registered for each compression and non-compression so as to enable the processing of switching the estimated data volumes Sy as previously described with reference to FIG. 9.

The following is an example of combination of the above methods. FIG. 16 illustrates an example of an estimated data volume table, wherein two estimated data volumes are registered for each set of plural conditions.

In an estimated data volume table 250e, an estimated data volume Sy1 of the average value and an estimated data volume Sy2 of the maximum value are registered for each set of conditions including compression method, color information, image area, and resolution.

Figure 17:
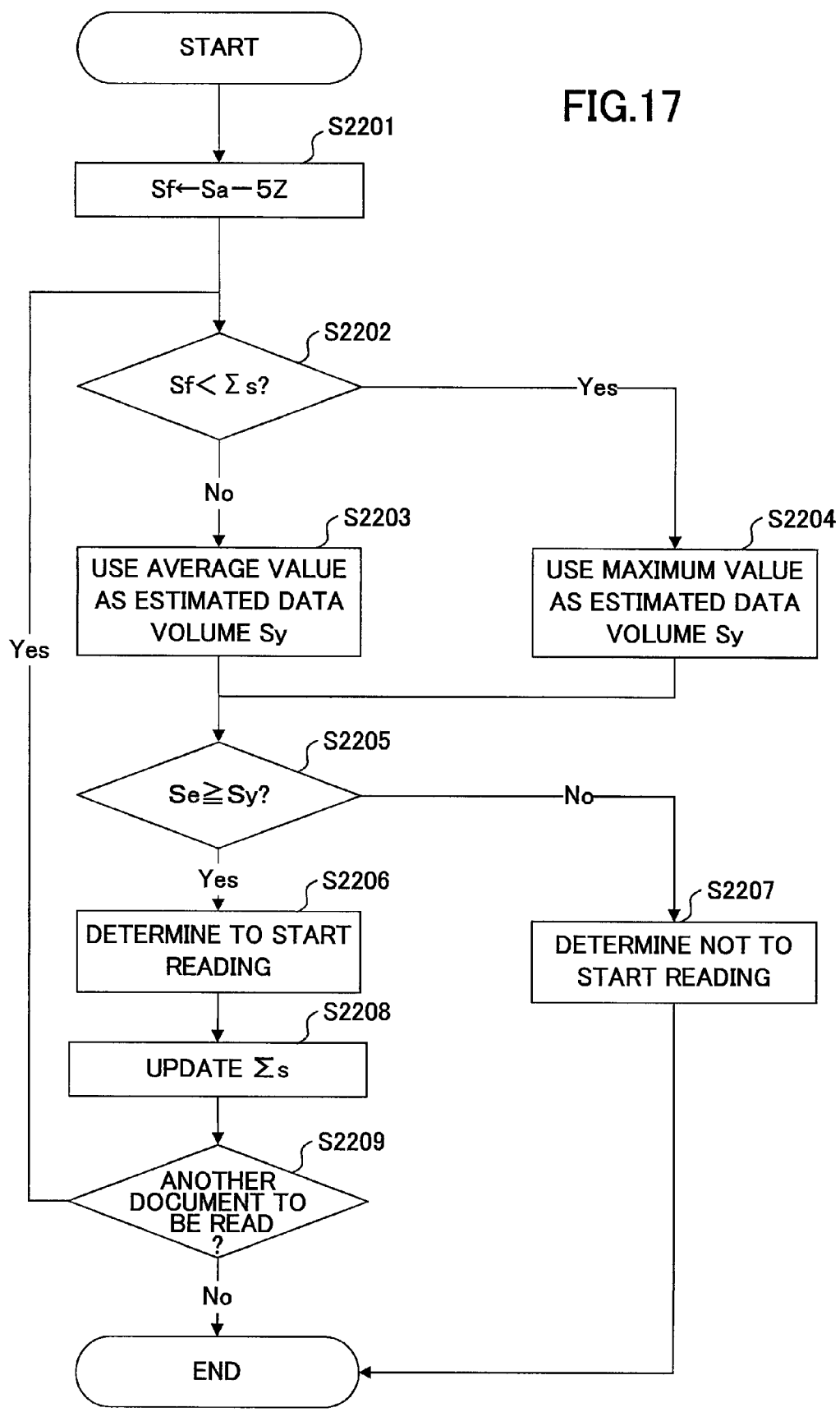
FIG. 17 is a flowchart showing a process for determining the estimated data volume, wherein two estimated data volumes are registered for each combination of plural conditions.

FIG. 17 is a flowchart showing a process for determining the estimated data volume Sy, wherein two estimated data volumes are registered for each set of plural conditions. The processing shown in the flowchart of FIG. 17 uses the estimated data volume table 250e of FIG. 16.

A reading condition, which has been selected on the operations unit 16 and entered by pressing the start key 305, specifies a compression B as the compression method, full color as the color information, A4 size as the image area, and 600 dpi×600 dpi as the resolution. This reading condition (hereinafter referred to as a "reading condition A") corresponds to the record in the last row (hereinafter referred to as the "corresponding record") in the estimated data volume table 250e.

First, the data storing control unit 206 calculates a switching threshold Sf (S2201). In the corresponding record in the estimated data volume table 250e, the estimated data volume of the maximum value is 5Z. That is, under the reading condition A, image data equal to or greater than 5Z are never stored. Accordingly, the data storing control unit 206 specifies (the storage capacity Sa−5Z) as the switching threshold Sf.

Here, the value of the switching threshold Sf that ensures 5Z (the estimated data volume Sy2) as the available capacity Se of the image storage area G is used in order to avoid memory overflow; however the switching threshold Sf may be determined based on other criterion. For example, suppose that, during copy processing, the image forming apparatus 100 reads ahead the original documents to the extent that does not affect the printing speed. If the image forming apparatus 100 is configured to read ahead two pages of the original documents, 2×5Z (the total stored data volume Σs read at the maximum size and using a compression method) may be used as the switching threshold Sf.

Then, the data storing control unit 206 compares the calculated switching threshold Sf with the total stored data volume Σs (S2202). If the total stored data volume Σs is equal to or less than the switching threshold Sf (No in S2202), the data storing control unit 206 uses the estimated data volume Sy1 (average volume), which is 3Z, as the estimated data volume Sy (S2203). Then, the overall control unit 201 acquires the available capacity Se of the image storage area G from the storage area control unit 202 and determines whether a to-be-read image can be stored into the image storage area G (S2205). If the available capacity Se is equal to or greater than 3Z (Yes in S2205), the overall control unit 201 determines that the to-be-read image can be stored and hence starts image reading (S2206). When the reading is completed, the actual data volume of the image is determined, and the data storing control unit 202 updates the total stored data volume Σs based on the actual data volume (S2208).

If there is another document to be read (Yes in S2209), Step S2202 and subsequent steps are executed. If the total store image data volume Σs exceeds the switching threshold Sf as a result of repeated execution of the Steps S2202 through S2209 (Yes in S2202), the data storing control unit 206 uses the estimated data volume of the maximum value, which is 5Z, as the estimated data volume Sy (S2204).

If the available capacity Se is less than the estimated data volume Sy (No in S2205), the overall control unit 201 determines that the to-be-read image cannot be stored and hence stops image reading (S2207).

As previously described, according to the image forming apparatus 100 of the second embodiment, determination whether the to-be-read image can be stored is made based on not only the available memory capacity but also the reading condition. This makes it possible to effectively store image data into memory while preventing memory overflow. Further, even in the case of storing image data in a compressed format, since the data volume after compression is estimated, determination whether it is possible to store the to-be-read image can be made before reading the image data.

Figure 18:
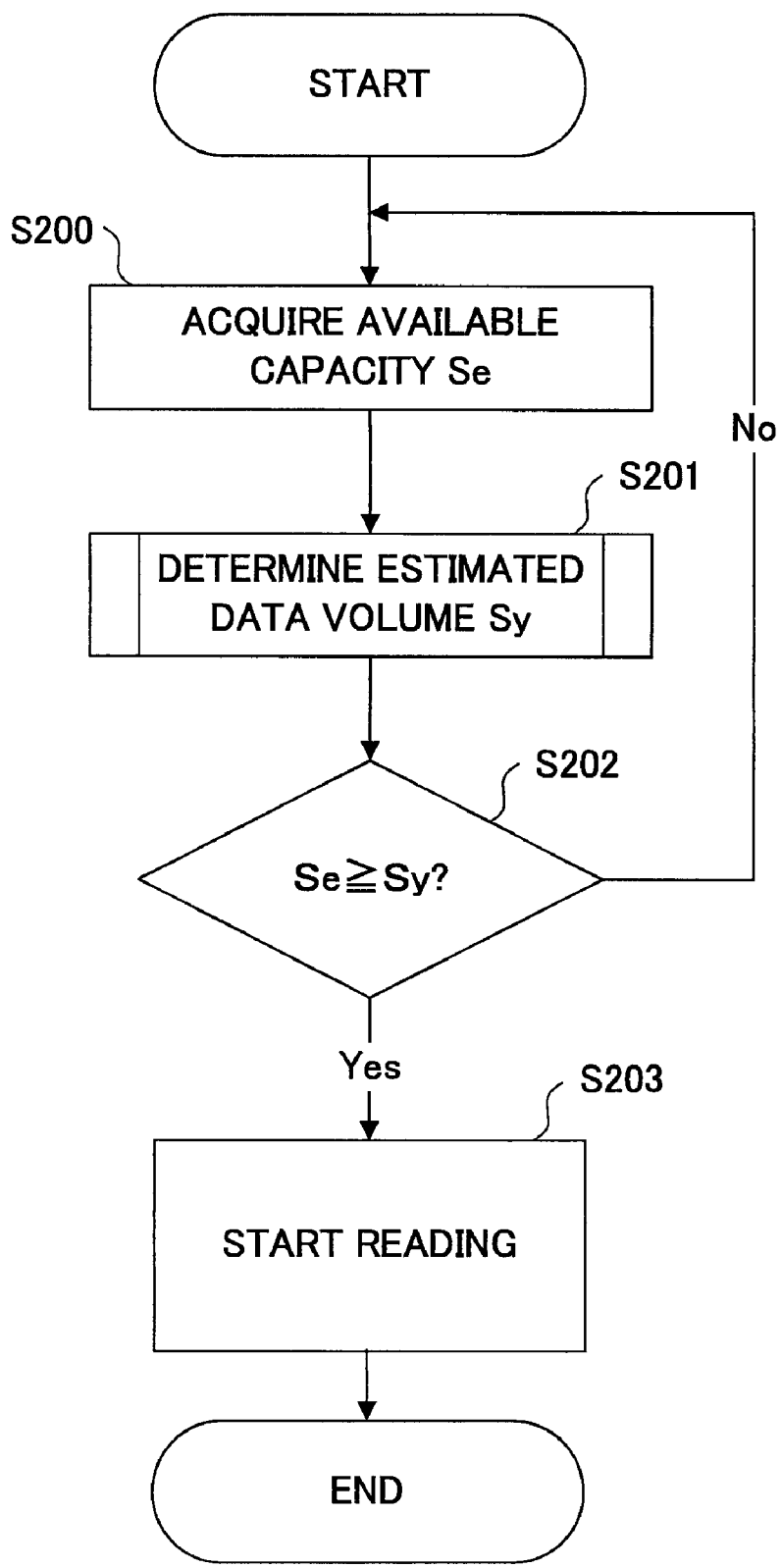
FIG. 18 is a flowchart showing a process for controlling the timing for starting image data reading according to a third embodiment of the present invention.

A third embodiment is described below. FIG. 18 is a flowchart showing a process for controlling the timing for starting image data reading according to the third embodiment. In FIG. 18, steps the same as those in FIG. 7 are denoted by the same step numbers, and are not described in detail.

The processing shown in FIG. 18 is different from the processing shown in FIG. 7 in an operation to be performed when the available capacity Se is determined to be less than the estimated data volume Sy (Se<Sy) in Step S202. In the third embodiment, if the available capacity Se is less than the estimated data volume Sy (No in S202), processing in Step S201 and subsequent steps are executed. That is, the overall control unit 201 withholds execution of image reading until the available capacity Se becomes equal to or greater than the estimated data volume Sy due to reduction of the total stored data volume $\Sigma s$, which may occur when the data stored in the image storage area G are erased upon being output (e.g., for printing).

As described above, when the image forming apparatus 100 of the third embodiment cannot store image data, the image forming apparatus 100 suspends image data reading until it becomes able to store image data instead of immediately cancelling image reading. Therefore, the image forming apparatus 100 can complete all the jobs input thereto. Further, when a reading condition requiring a large storage volume is selected, the timing for starting image data reading is delayed only when the available capacity of the image storage area G is smaller than the volume of the estimated data volume of the to-be-read image. That is, if the image storage area G has sufficient available capacity, the image data are read without delaying the timing for reading them. Even when the available capacity is small, if the estimated data volume Sy is smaller than the available capacity Se, the image data are read without delaying the timing for reading them.

Figure 19:
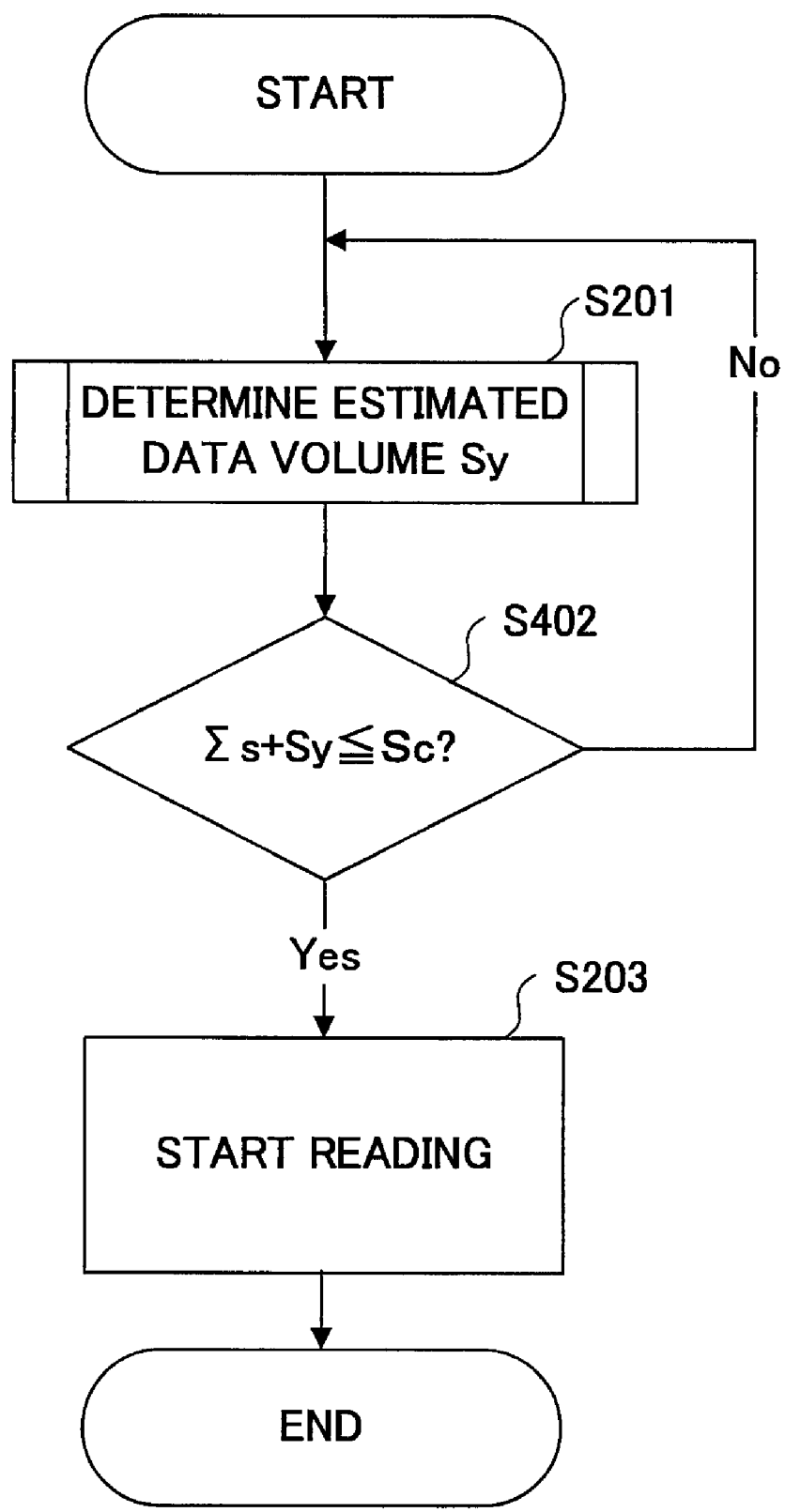
FIG. 19 is a flowchart showing a process for controlling the timing for starting image data reading according to a fourth embodiment of the present invention.

A fourth embodiment is described below. FIG. 19 is a flowchart showing a process for controlling the timing for starting image data reading according to the fourth embodiment. In FIG. 19, steps the same as those in FIG. 18 are denoted by the same step numbers, and are not described in detail.

The flowchart shown in FIG. 19 is different from the flowchart of FIG. 18 in that Step S402 is provided in place of Step S202. In Step S402, the overall control unit 201 determines whether to start image data reading based on a CPM (Copy Per Minute) achievable stored volume Sc.

Figure 20:
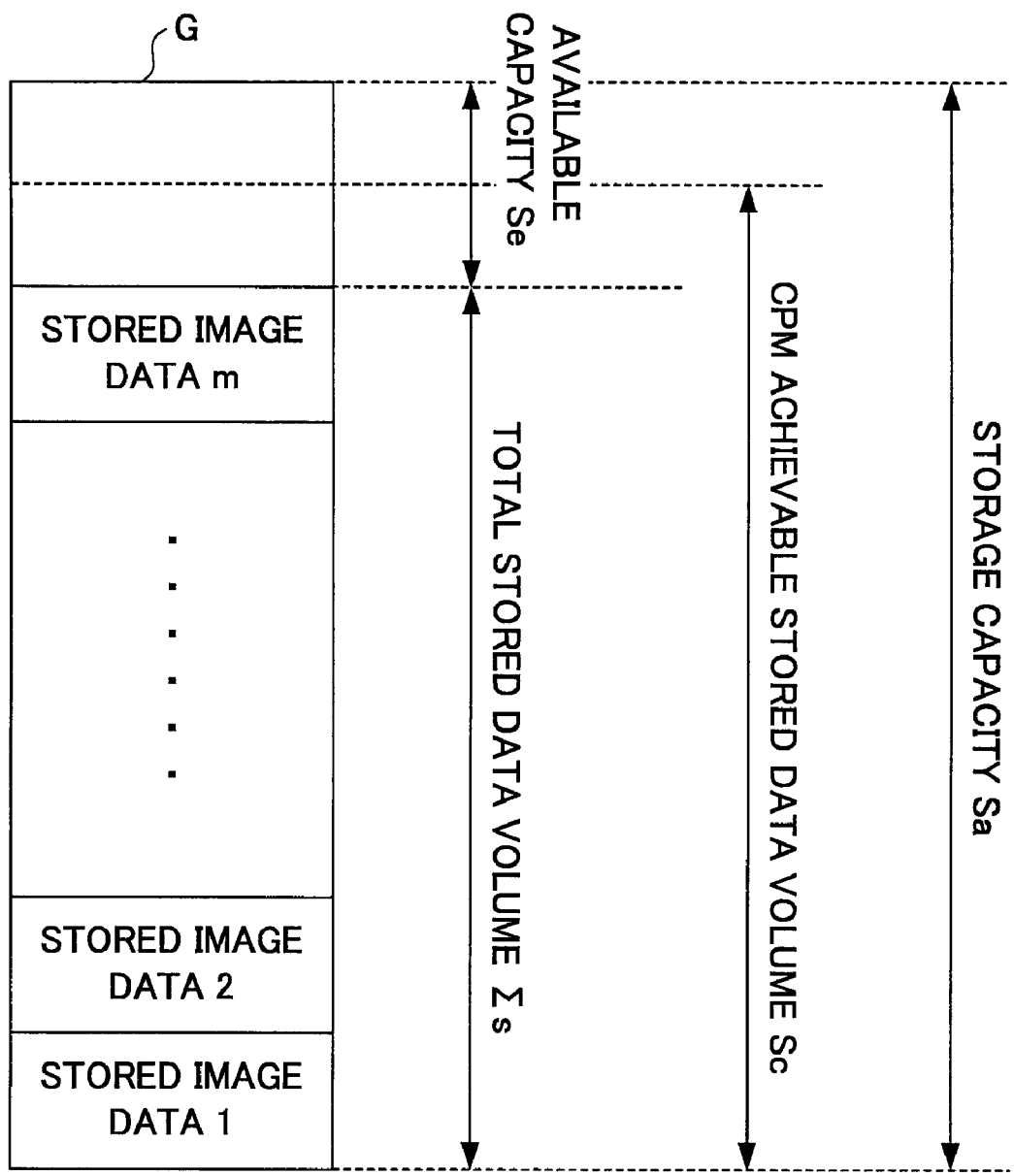
FIG. 20 is a diagram used to explain a CPM achievable stored data volume.

FIG. 20 is a diagram used to explain the CPM achievable stored data volume Sc. As shown in FIG. 20, the CPM achievable stored data volume Sc is defined as a parameter in the image storage area G. The CPM achievable stored data volume Sc is a parameter indicating the volume of image data stored in the image storage area G required for achieving productivity of image formation by the image forming apparatus 100 based on its specification.

Determining whether to start reading based on the reading condition improves efficiency of storing image data in the image storage area G and thus increases the volume of image data that can be stored therein. However, if output of image data by an output unit (e.g. the printer engine 19) is slower than input of image data, productivity of copy processing by the image forming apparatus 100 is not improved. In view of this, the image forming apparatus 100 of this embodiment determines whether to start reading based on the performance of the output unit and the data volume (the CPM achievable stored data volume Sc) indicating the volume of image data in the image storage area G required for achieving the productivity of the image forming apparatus 100.

The CPM achievable stored data volume Sc is preferably determined based on performances (e.g. processing speed) of the input unit (such as the scanner engine 5) and the output unit (such as the printer engine 19) so as to make the output unit continue working until completion of a job. It is also preferable that the CPM achievable stored data volume Sc be determined by taking into account failures (failures of input of image data into the image storage area G) such as jamming in the input unit. That is, it is not enough to store a piece of image data in the image storage area G. The average time required for recovery from such failure is calculated based on empirical data, so that the CPM achievable stored volume Sc is determined with a buffer of the average recovery time. Thus, even during recovery from a failure, the probability of the image storage area G becoming empty is lowered, thereby maintaining the printer engine 19 working. The CPM achievable stored data volume Sc needs to be smaller than the storage capacity Sa. In this embodiment, the CPM achievable stored data volume Sc is stored in the NVRAM 21 or the ROM 2 and managed by the data registration control unit 205.

Referring back to the flowchart of FIG. 19, in Step S402, the overall control unit 201 acquires the CPM achievable stored data volume Sc from the data registration control unit 205, and compares the value of the CPM achievable stored data volume Sc with the sum of the total stored data volume $\Sigma s$ and the estimated data volume Sy (i.e. the estimated volume of data in the image storage area G after reading of a to-be-read image). If $(\Sigma s+Sy) \leq Sc$, the overall control unit 201 starts the reading of the to-be-read image (S203). If $(\Sigma s+Sy)>Sc$, processing in Step S201 and the subsequent step are executed. That is, the overall control unit 201 withholds execution of image reading until $(\Sigma s+Sy) \leq Sc$ is satisfied due to reduction of the total stored data volume $\Sigma s$, which may occur when the data stored in the image storage area G are erased upon being output (e.g., for printing).

As described above, the image forming apparatus 100 of the fourth embodiment determines whether to start reading image data based on the CPM achievable stored data volume Sc. The CPM achievable stored data volume Sc is smaller than the storage capacity Sa. Therefore, even if the estimated data volume Sy is incorrect, the probability of occurrence of memory overflow is low. Since the CPM achievable stored data volume Sc is determined to achieve a target productivity level, the performance of copy processing is achieved even without fully using the storage capacity Sa.

A fifth embodiment is described below. The fifth embodiment and the subsequent embodiments are focused on the timing for determining whether to start reading.

Figure 21:
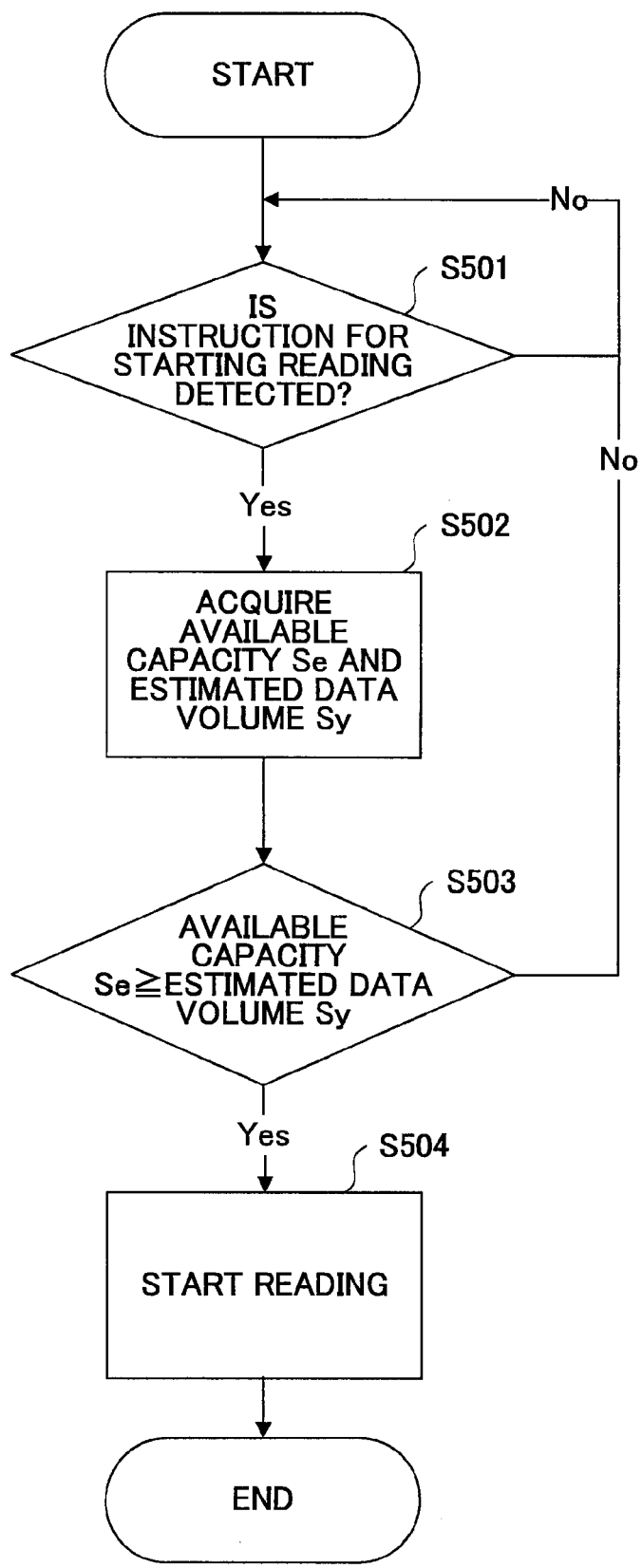
FIG. 21 is a flowchart showing a process for controlling the timing for starting image data reading according to a fifth embodiment of the present invention.

FIG. 21 is a flowchart showing a process for controlling the timing for starting image data reading according to the fifth embodiment.

If the overall control unit 201 detects an instruction for starting a reading operation, which has been issued by pressing the start key 305 on the operations unit 16 (Yes in S501), the overall control unit 201 acquires the available capacity Se and the estimated data volume Sy from the storage area control unit 202 and the data storing control unit 206, respectively (S502). In this embodiment, the estimated data volume Sy is determined by the data storing control unit 206 with the process as described in the first embodiment.

If the available capacity Se is equal to or greater than the estimated data volume Sy (Yes in S503), the overall control unit 201 starts a reading operation (S504). If the available capacity Se is less than the estimated data volume Sy (No in S503), the overall control unit 201 suspends a reading operation until the next detection of an instruction for starting a reading operation. It is to be noted that the determination operation in Step S503 may be replaced with the determination operation based on the CPM achievable stored data volume Sc in Step S402 of FIG. 19.

The fifth embodiment is effective in the case where the original document is placed on a platen. In the case where the original document is placed on a platen, reading of the document starts in response to an instruction from the user (i.e. the start key 305 pressed by the user). Therefore, since determination whether to start reading is made upon reception of an instruction from the user, it is possible to prevent execution of a reading operation for a to-be-read image when it cannot be stored.

Figure 22:
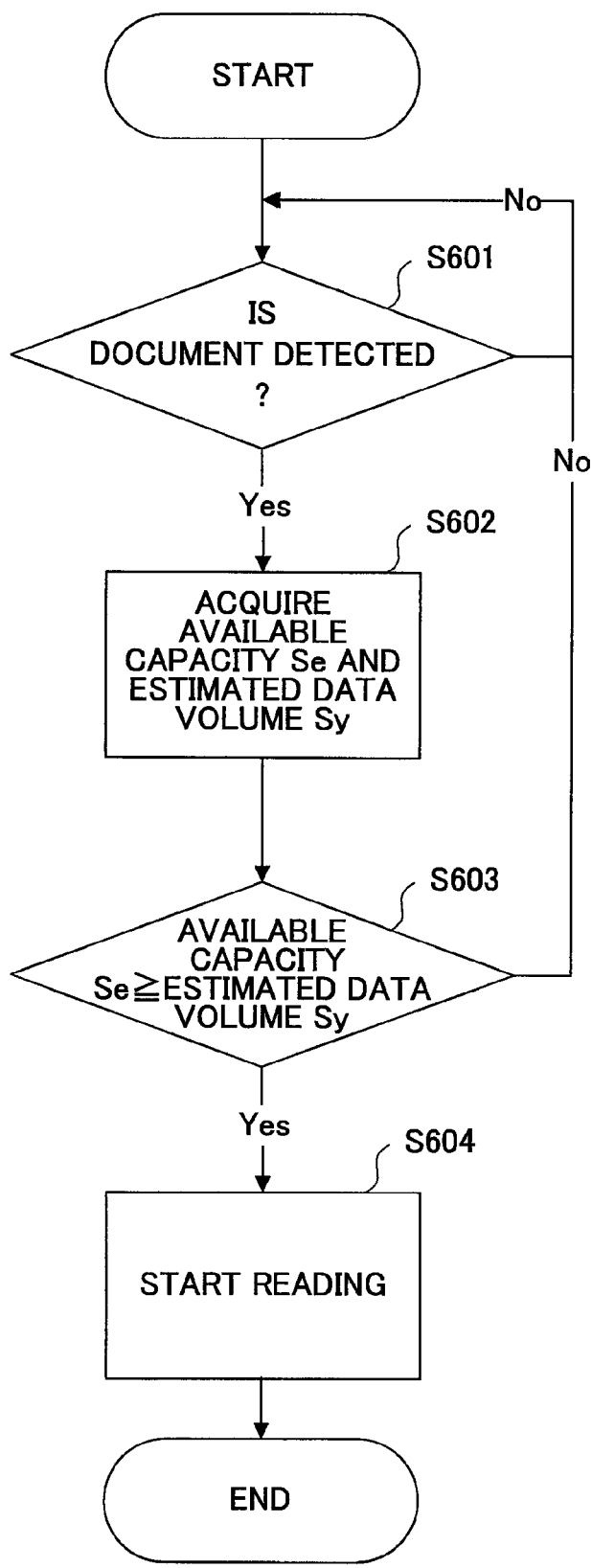
FIG. 22 is a flowchart showing a process for controlling the timing for starting image data reading according to a sixth embodiment of the present invention.

A sixth embodiment is described below. FIG. 22 is a flowchart showing a process for controlling the timing for starting image data reading according to the sixth embodiment.

If the overall control unit 201 detects placement of a document onto a contact glass (Yes in S601), the overall control unit 201 acquires the available capacity Se and the estimated data volume Sy from the storage area control unit 202 and the data storing control unit 206, respectively (S602). If the available capacity Se is equal to or greater than the estimated data volume Sy (Yes in S603), the overall control unit 201 starts a reading operation (S604). If the available capacity Se is less than the estimated data volume Sy (No in S603), the overall control unit 201 suspends a reading operation until the next detection of placement of a document. It is to be noted that the determination operation in Step S603 may be replaced with the determination operation based on the CPM achievable stored data volume Sc in Step S402 of FIG. 19.

The sixth embodiment is effective in the case where the original document is placed on an ADF. In the case where the original document is placed on an ADF, reading of the document starts in response to detection of placement of a document on the ADF. Therefore, since determination whether to start reading is made upon detection of the document, it is possible to prevent feeding and feeding back the original document when a to-be-read image cannot be stored.

Figure 23:
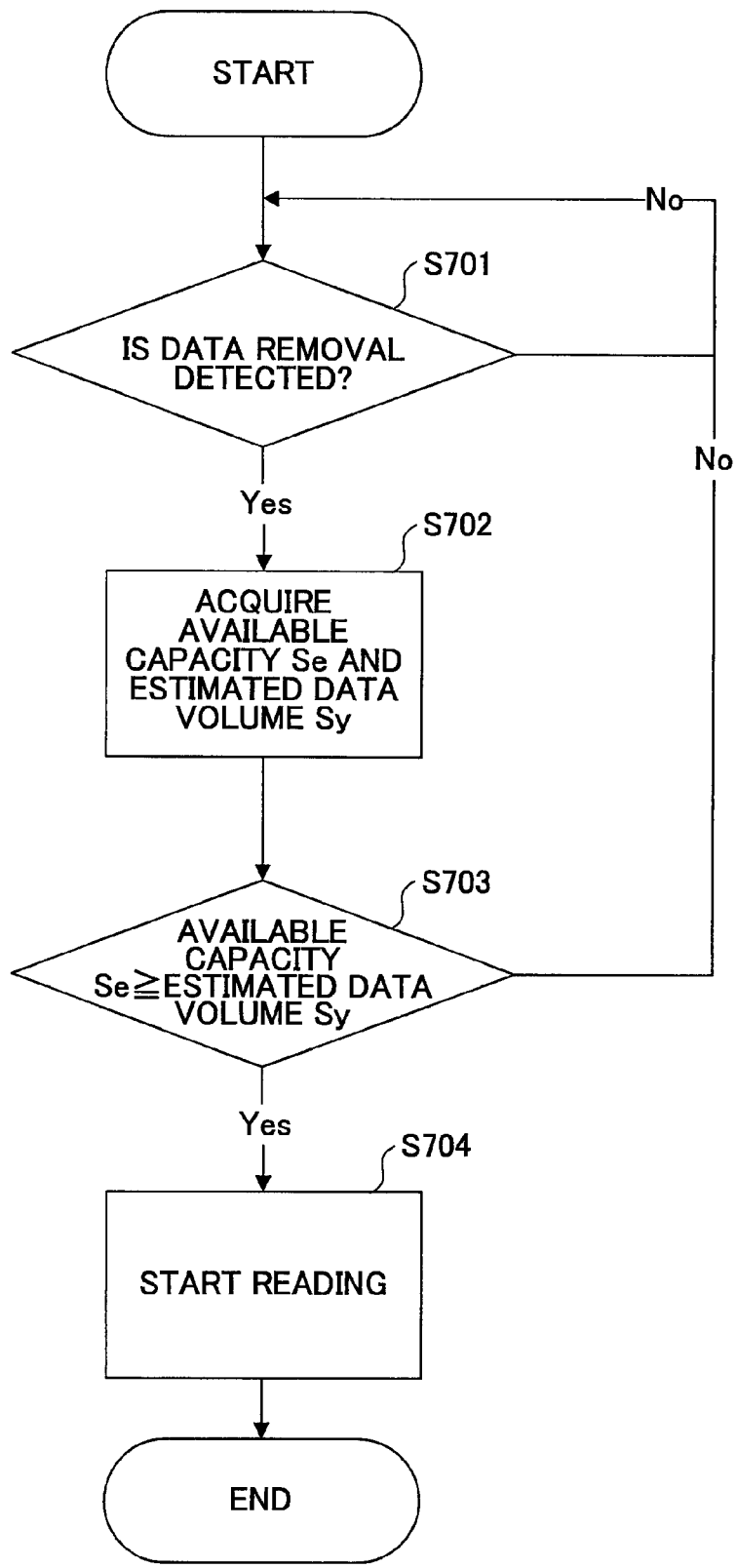
FIG. 23 is a flowchart showing a process for controlling the timing for starting image data reading according to a seventh embodiment of the present invention.

A seventh embodiment is described below. FIG. 23 is a flowchart showing a process for controlling the timing for starting image data reading according to the seventh embodiment.

If the overall control unit 201 detects removal of image data from the image storage area G after being printed or the like (Yes in S701), the overall control unit 201 acquires the available capacity Se and the estimated data volume Sy from the storage area control unit 202 and the data storing control unit 206, respectively (S702). If the available capacity Se is equal to or greater than the estimated data volume Sy (Yes in S703), the overall control unit 201 starts a reading operation (S704). If the available capacity Se is less than the estimated data volume Sy (No in S703), the overall control unit 201 suspends a reading operation until the next detection of data removal. It is to be noted that the determination operation in Step S703 may be replaced with the determination operation based on the CPM achievable stored data volume Sc in Step S402 of FIG. 19.

The available capacity Se increases upon removal of stored data. Therefore, the image forming apparatus 100 of the seventh embodiment can prevent useless execution of a determination operation of determining whether to start reading when, for example, a user places a document onto the ADF by mistake.

Figure 24:
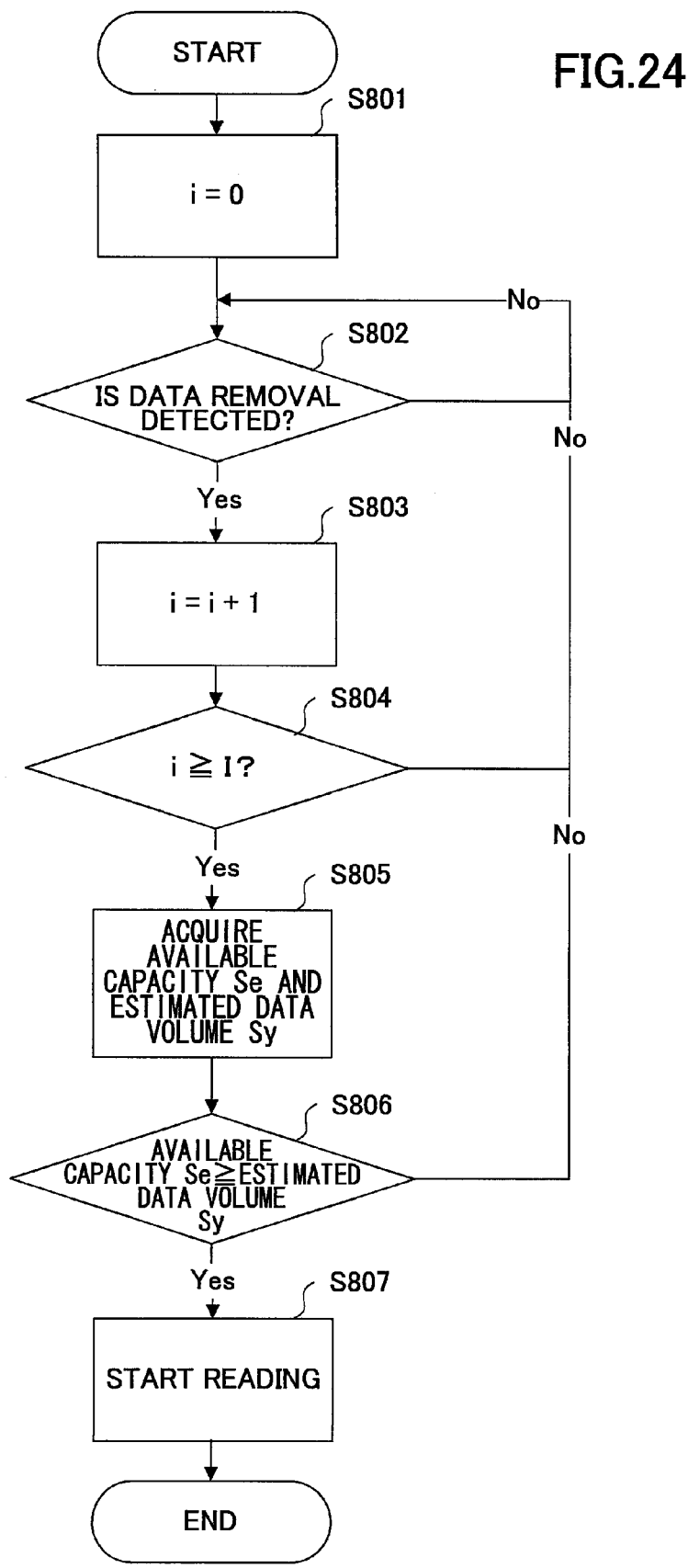
FIG. 24 is a flowchart showing a process for controlling the timing for starting image data reading according to an eighth embodiment of the present invention.

An eighth embodiment is described below. FIG. 24 is a flowchart showing a process for controlling the timing for starting image data reading according to the eighth embodiment.

In Step S801, the overall control unit 201 initializes the value of a counter variable i to zero. Then, if the overall control unit 201 detects removal of image data from the image storage area G (Yes in S802), the overall control unit 201 increments the counter variable i (S803). Then, if the counter variable i is equal to or greater than a predetermined value I (Yes in S804), the overall control unit 201 acquires the available capacity Se and the estimated data volume Sy from the storage area control unit 202 and the data storing control unit 206, respectively (S805). Then, if the available capacity Se is equal to or greater than the estimated data volume Sy (Yes in S806), the overall control unit 201 starts a reading operation (S807). If the available capacity Se is less than the estimated data volume Sy (No in S806), the overall control unit 201 suspends a reading operation until the counter variable i becomes equal to or greater than the predetermined value I due to data removal. It is to be noted that the determination operation in Step S806 may be replaced with the determination operation based on the CPM achievable stored data volume Sc in Step S402 of FIG. 19.

In the eighth embodiment, the predetermined value I for double-sided printing may be 2, for example. In double-sided printing, reading of image data of the front side of a document is started after removal of image data of two pages. The processing shown in FIG. 24 may be executed only when reading the front side of the document. That is, the number of pieces of image data to be removed from the image storage area G upon one print operation (printing of one page) may be selected as the predetermined value I.

In the case where plural pieces of data correspond to one recording medium (e.g. a sheet of paper), the pieces of data are removed substantially at the same time. Therefore, according to the image forming apparatus 100 of the eighth embodiment, there is no need to execute a determining operation every time image data are removed, and therefore it is possible to surely execute copy operations under the specified output condition. It is to be noted that this method may be used for reducing the number of times of making determination of timing control regardless of output conditions.

Figure 25:
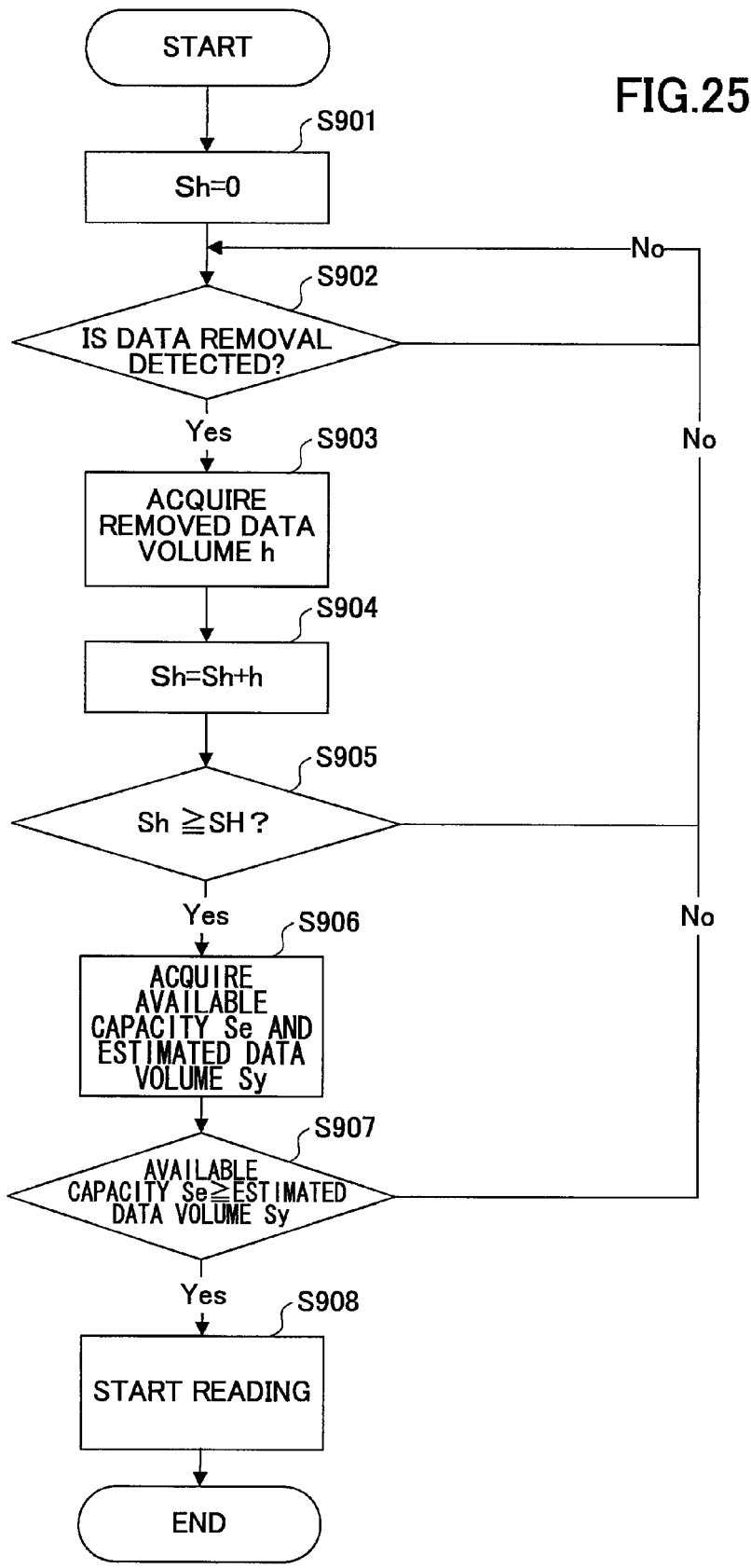
FIG. 25 is a flowchart showing a process for controlling the timing for starting image data reading according to a ninth embodiment of the present invention.

A ninth embodiment is described below. FIG. 25 is a flowchart showing a process for controlling the timing for starting image data reading according to the ninth embodiment.

In Step S901, the overall control unit 201 initializes the value of a variable Sh to zero. Then, if the overall control unit 201 detects removal of image data from the image storage area G (Yes in S902), the overall control unit 201 acquires a volume h of the last removed data from the storage area control unit 202 (S903). The overall control unit 201 assigns the sum of the variable Sh and the volume h of the removed data to the variable Sh (S904). Thus, the value of the variable Sh indicates the total volume of the data that have been removed. If the value of the variable Sh is equal to or grater than a predetermined capacity SH (Yes in S905), the overall control unit 201 acquires the available capacity Se and the estimated data volume Sy from the storage area control unit 202 and the data storing control unit 206, respectively (S906). Then, if the available capacity Se is equal to or greater than the estimated data volume Sy (Yes in S907), the overall control unit 201 starts a reading operation (S908). If the available capacity Se is less than the estimated data volume Sy (No in S907), the overall control unit 201 suspends a reading operation until the total volume Sh of the removed data becomes equal to or greater than the predetermined capacity SH. It is to be noted that the determination operation in Step S907 may be replaced with the determination operation based on the CPM achievable stored data volume Sc in Step S402 of FIG. 19.

According to the ninth embodiment, for example, the number of executions of processing in Step S906 and the subsequent step can be reduced depending on the value of SH, thereby increasing the processing efficiency. The value of SH may be determined according to an operational purpose. For example, the value of SH may be the estimated data volume Sy.

Although the above described embodiments mainly refer to the case where image data are stored in a compressed format, the technique of determining whether it is possible to store image data based on the reading condition is also applicable in the case where the image data are stored without being compressed. If image data are stored without being compressed, since the data volume of a to-be-read image is easily calculated, determination whether the to-be-read image can be stored may be made based on a calculated actual data volume in place of the estimated data volume Sy.

It should be understood that the present invention is not limited to the specifically disclosed embodiment, and variations and modifications may be made without departing from the scope of the present invention.

The present application is based on Japanese Priority Application No. 2006-230788 filed on Aug. 28, 2006, with the Japanese Patent Office, the entire contents of which are hereby incorporated by reference.

What is claimed is:

1. An image forming apparatus comprising:
   an input unit through which a condition for reading first image data of a document is input;
   a reading unit to read the first image data under the reading condition input through the input unit;
   a first storage unit to store second image data based on the first image data read by the reading unit;
   a second storage unit to store information indicative of a relationship between the reading condition and at least one first estimated volume of the second image data to be stored in the first storage unit;
   a data volume estimating unit that estimates a volume of the second image data based on the reading condition and the information stored in the second storage unit to generate a second estimated data volume; and
   a determining unit to determine whether to read the first image data based on the second estimated data volume and a volume of third image data stored in the first storage unit;
   wherein a timing for reading the first image data is controlled according to a determination result by the determining unit.

2. The image forming apparatus as claimed in claim 1, wherein, if the second estimated data volume is greater than an available capacity of the first storage unit, the determining unit suspends reading of the image data.

3. The image forming apparatus as claimed in claim 1, wherein, if a sum of the second estimated volume and the volume of the third image data stored in the first storage unit is greater than a specific data volume, the determining unit determines to suspend reading of the first image data, the specific data volume being determined based on performances of input and output of image data and a time period required for recovery from a possible failure of input of image data.

4. The image forming apparatus as claimed in claim 1, wherein the determining unit determines whether to read the first image data upon reception of an instruction for reading the first image data.

5. The image forming apparatus as claimed in claim 1, wherein the determining unit determines whether to read the first image data upon detection of placement of the document.

6. The image forming apparatus as claimed in claim 1, wherein the determining unit determines whether to read the first image data upon removal of the third image data stored in the first storage unit.

7. The image forming apparatus as claimed in claim 1, wherein the determining unit determines whether to read the first image data when the number of times of removal of image data stored in the first storage unit reaches a target number of times.

8. The image forming apparatus as claimed in claim 1, wherein the determining unit determines whether to read the first image data when a volume of image data removed from the first storage unit reaches a threshold.

9. The image forming apparatus as claimed in claim 1, wherein the first image data is same as the second image data.

10. The image forming apparatus as claimed in claim 1, wherein the second image data is the first image data compressed.

11. The image forming apparatus of claim 1, wherein the first estimated volume is a plurality of first estimated volumes, and
   the second estimated volume is one of the first estimated volumes.

12. The image forming apparatus of claim 1, wherein the information includes a second reading condition,
   the second estimated value is a fraction of the at least one first estimated value, and
   the fraction is determined according to a difference between the condition for reading the first image data and the second reading condition.

13. An information processing method executable by an image forming apparatus, comprising:
   inputting a condition for reading first image data of a document;
   reading the first image data under the reading condition;
   storing second image data based on the first image data into a first storage unit;
   estimating a volume of the second image data to generate a first estimated data volume based on the reading condition and information stored in a second storage unit, the information indicating a relationship between the reading condition and at least one second estimated volume of the second image data; and
   determining whether to read the first image data based on the first estimated data volume and a volume of third image data stored in the first storage unit;
   wherein a timing for reading the first image data is controlled according to a determination result of the determining whether to read the first image data.

14. The information processing method as claimed in claim 13, wherein, if the first estimated data volume is greater than an available capacity of the first storage unit, the determining whether to read the first image data determines to suspend reading of the first image data.

15. The information processing method as claimed in claim 13, wherein, if a sum of the first estimated volume of the second image data and the volume of the third image data stored in the first storage unit is greater than a specific data volume, the determining whether to read the first image data determines to suspend reading of the first image data, the specific data volume being determined based on performances of input and output of image data and a time period required for recovery from a possible failure of input of image data.

16. The information processing method as claimed in claim 13, wherein the determining whether to read the first image data determines whether to read the first image data upon reception of an instruction for reading the first image data.

17. The information processing method as claimed in claim 13, wherein the determining whether to read the first image data determines whether to read the first image data upon detection of placement of the document.

18. The information processing method as claimed in claim 13, wherein the determining whether to read the first image data determines whether to read the first image data upon removal of the third image data stored in the first storage unit.

19. The information processing method as claimed in claim 13, wherein the determining whether to read the first image data determines whether to read the first image data when the number of times of removal of image data stored in the first storage unit reaches a target number of times.

20. The information processing method as claimed in claim 13, wherein the determining whether to read the first image data determines whether to read the first image data when a volume of image data removed from the first storage unit reaches a threshold.

21. A non-transitory computer-readable medium storing a program for causing a computer to perform the information processing method as claimed in claim 13.

* * * * *